US006118474A

United States Patent [19]
Nayar

[11] Patent Number: 6,118,474
[45] Date of Patent: *Sep. 12, 2000

[54] OMNIDIRECTIONAL IMAGING APPARATUS

[75] Inventor: Shree K. Nayar, New York, N.Y.

[73] Assignee: The Trustees of Columbia University in the City of New York, New York, N.Y.

[ * ] Notice: This patent is subject to a terminal disclaimer.

[21] Appl. No.: 08/986,082

[22] Filed: Dec. 5, 1997

Related U.S. Application Data

[63] Continuation-in-part of application No. 08/644,903, May 10, 1996, Pat. No. 5,760,826.

[51] Int. Cl.[7] .................................................. H04N 7/00
[52] U.S. Cl. ........................... 348/36; 358/108; 358/88; 358/87; 358/209; 359/724; 359/725; 359/731; 359/366; 359/729; 364/460; 250/223; 250/208
[58] Field of Search ..................... 348/36, 143; 350/412, 350/441

[56] References Cited

U.S. PATENT DOCUMENTS

| D. 312,263 | 11/1990 | Charles | 16/237 |
|---|---|---|---|
| 2,638,033 | 5/1953 | Buchele et al. | 88/57 |
| 3,505,465 | 4/1970 | Rees | 178/6 |
| 4,045,116 | 8/1977 | La Russa | 350/21 |
| 4,136,926 | 1/1979 | Sigler | 350/55 |
| 4,395,093 | 7/1983 | Rosendahl et al. | 350/441 |
| 4,421,721 | 12/1983 | Byer et al. | 422/109 |
| 4,549,208 | 10/1985 | Kamejima et al. | 348/36 |
| 4,566,763 | 1/1986 | Greguss | 350/441 |
| 4,820,048 | 4/1989 | Barnard | 356/328 |
| 5,029,963 | 7/1991 | Naselli et al. | 350/412 |
| 5,185,667 | 2/1993 | Zimmermann . | |
| 5,315,415 | 5/1994 | Kawai et al. | 358/515 |
| 5,359,363 | 10/1994 | Kuban et al. . | |
| 5,473,474 | 12/1995 | Powell | 359/725 |
| 5,530,650 | 6/1996 | Biferno et al. | 348/117 |
| 5,539,483 | 7/1996 | Nalwa | 353/94 |
| 5,563,650 | 10/1996 | Poelstra | 348/36 |
| 5,610,391 | 3/1997 | Ringlien | 250/223 B |
| 5,627,675 | 5/1997 | Davis et al. | 359/366 |
| 5,631,778 | 5/1997 | Powell | 359/724 |
| 5,668,622 | 9/1997 | Charbonnier et al. | 351/209 |
| 5,760,826 | 6/1998 | Nayer et al. | 348/36 |

FOREIGN PATENT DOCUMENTS

| 8275066 | of 0000 | Japan . |
| WO9743854 | 11/1997 | WIPO . |

OTHER PUBLICATIONS

S. Bogner, "An Introduction to Panospheric Imaging", Proceedings of the 1995 IEEE International Conference on Systems, Man and Cyberetics, pp. 3099–3106 (1995).

S. Bogner, "Application of Panospheric Imaging to an Armored Vehicle Viewing System", Proceedings of the 1995 IEEE International Conference on Systems, Man and Cybernetics, pp. 3113–3116 (1995).

(List continued on next page.)

Primary Examiner—Chris S. Kelley
Assistant Examiner—Shawn S. An
Attorney, Agent, or Firm—Baker Botts L.L.P.

[57] ABSTRACT

An imaging apparatus for sensing an image of a scene from a substantially single viewpoint, which includes a truncated, substantially paraboloid-shaped reflector positioned to orthographically reflect principal rays of electromagnetic radiation radiating from the scene, the paraboloid-shaped reflector having a focus coincident with the single viewpoint of the imaging apparatus, including the paraboloid-shaped reflector. The imaging apparatus also includes telecentric means, optically coupled to the paraboloid-shaped reflector, for substantially filtering out principal rays of electromagnetic radiation which are not orthographically reflected by the paraboloid-shaped reflector. The imaging apparatus also includes one or more image sensors positioned to receive the orthographically reflected principal rays of electromagnetic radiation from the paraboloid-shaped reflector, thereby sensing the image of the scene.

45 Claims, 15 Drawing Sheets

OTHER PUBLICATIONS

J. Murphy, "Application of Panospheric Imaging to a Tele-operated Lunar Rover", Proceedings of the 1995 IEEE International Conference on Systems, Man and Cybernetics, pp. 3117–3121 (1995).

John R. Murphy, A Robotics Ph.D. Thesis Proposal "Effective Teleoperation Through Immersive Visualization", The Robotics Institute Carnegie Mellon University, pp. 1–19 (May 10, 1995).

E. Hall et al., "Omnidirectional Viewing Using a Fish Eye Lens," SPIE–Optics, Illumination, and Image Sensing for Machine Vision, vol. 728, pp. 250–256 (1986).

S. Zimmermann et al., "A Video Pan/Tilt/Magnify/Rotate System with no Moving Parts," *Proceedings of 1992 IEEE/AIAA 11th Digital Avionics Systems Conference*, pp. 523–531 (IEEE, 1992) (Zimmermann et al. Article).

K. Yamazawa et al., "Obstacle Detection with Omnidirectional Image Sensor HyperOmni Vision," Proceedings of 1995 IEEE International Conference on Robotics and Automation, vol. 1, pp. 1062–1067 (IEEE 1995).

Y. Yagi et al., "Evaluating Effectivity of Map Generation by Tracking Vertical Edges in Omnidirectional Image Sequence," Proceedings of 1995 IEEE International Conference on Robotics and Automation, vol. 3, pp. 2334–2339 (IEEE 1995).

Y. Yagi et al., "Map–based Navigation for a Mobile Robot with Omnidirectional Image Sensor COPIS," IEEE Transactions on Robotics and Automation, vol. 11, No. 5, pp. 634–648 (IEEE Oct. 1995) (Yagi et al. I).

V. Nalwa, "A True Omni–Directional Viewer," Bell Laboratories Technical Memorandum, BL0115500–960115–01 (Jan. 1996).

S.E. Chen, "Quick Time® VR–An Image–Based Approach to Virtual Environment Navigation," Proceedings of SIGGRAPH 1995, Los Angeles, CA, Aug. 6–11, 1995.

Leonard McMillan and Gary Bishop, "Plenoptic Modeling: an Image–Based Rendering System," Proceedings of SIGGRAPH 1995, Los Angeles, CA, Aug. 6–11, 1995.

Mitsubishi Electric America, "Omnidirectional Vision System—Real–time panaramic view with magnification of area of interest" (downloaded from www.mitsubishi.com/mea/future/omni/index.html on Dec. 11, 1998).

Mitsubishi Electric America, "Product Highlight—Omnidirectional Vision System" (downloaded form www.mitsubishi.com/mea/future/omni/omnipr.html on Dec. 11, 1998).

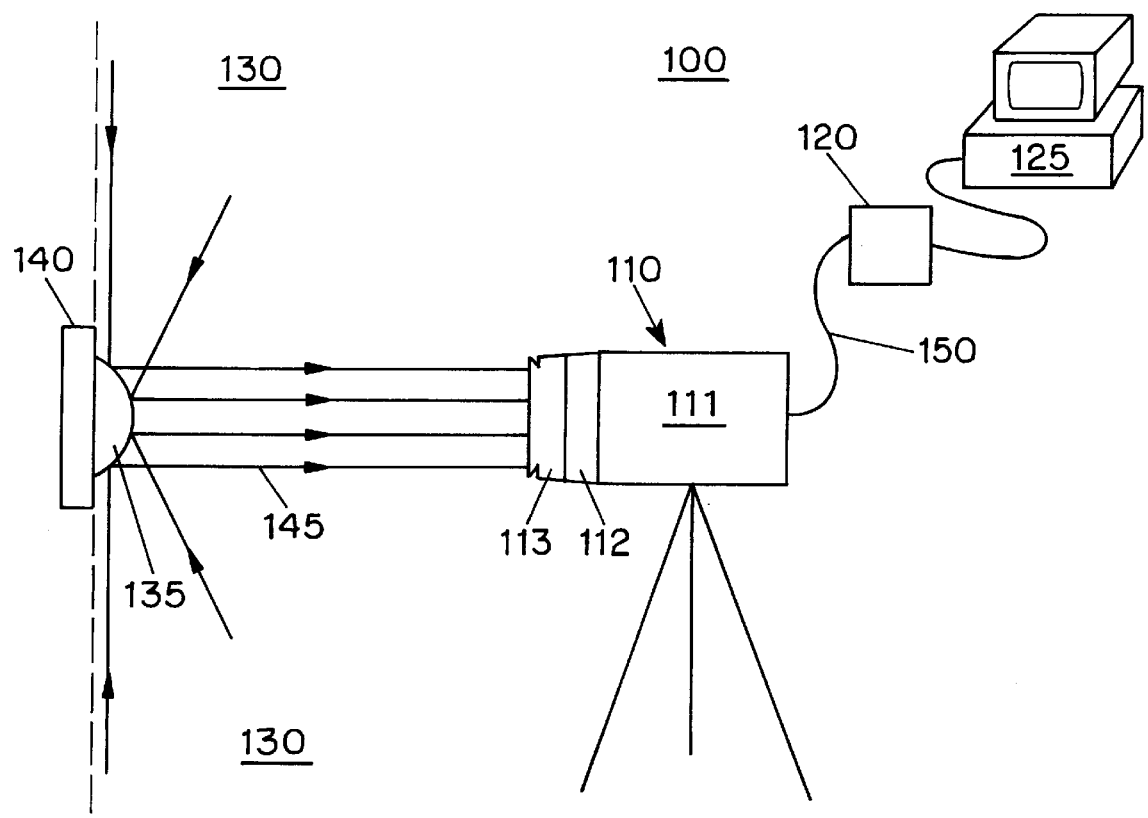
FIG. 1A
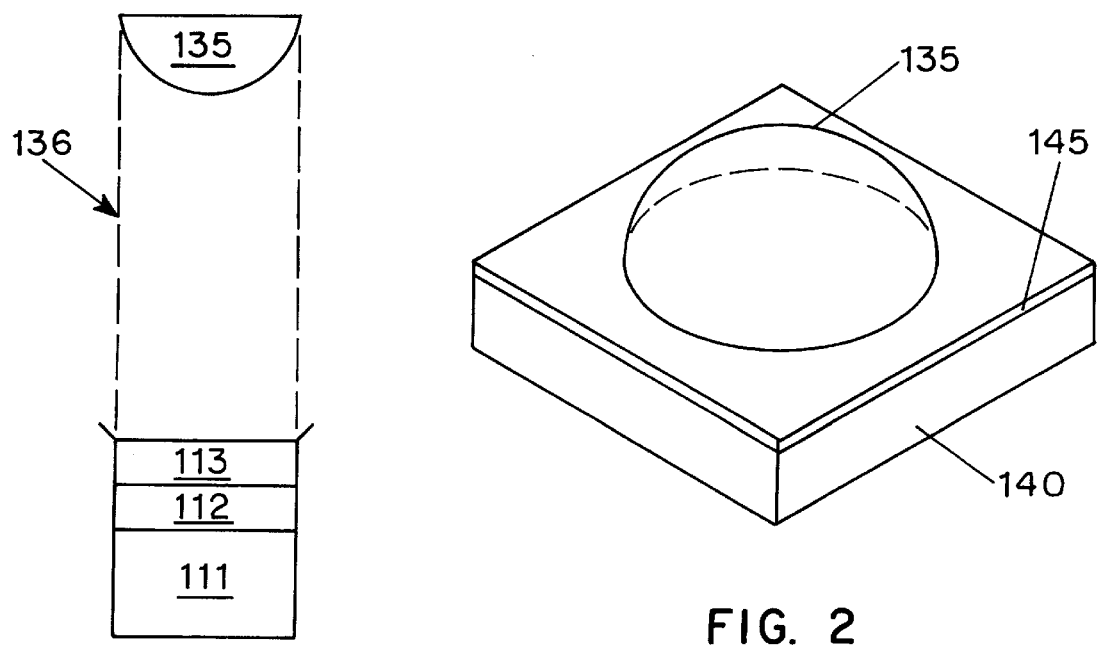
FIG. 1B
FIG. 2

OMNIDIRECTIONAL IMAGING APPARATUS

CROSS-REFERENCE TO RELATED APPLICATIONS

This application is a continuation-in-part of U.S. patent application Ser. No. 08/644,903, filed on May 10, 1996, now U.S. Pat. No. 5,760,826 which is incorporated by reference herein.

NOTICE OF GOVERNMENT RIGHTS

The U.S. Government has certain rights in this invention pursuant to the terms of the National Science Foundation Young Investigator Award and the Department of Defense/Office of Naval Research MURI Grant No. 00014-95-1-0601.

BACKGROUND OF THE INVENTION

1. Field of the Invention

This invention relates to omnidirectional image sensing with reference to a single viewpoint, and, more particularly to such image sensing using a truncated, substantially paraboloid-shaped reflector.

2. Discussion of the State of the Art

For many applications such as surveillance, teleconferencing, remote sensing, photogrammetry, model acquisition, virtual reality, computer graphics, machine vision and robotics, it is desirable that an imaging system have a large field of view so as to be able to take in as much information as possible about the world around it.

Traditional imaging systems include a camera with a lens that provides a perspective projection of an image. However, a camera with even a very wide angle lens has only a limited field of view (i.e., covering less than a full hemisphere). This limited field of view may be expanded by tilting and panning the entire imaging system about its center of projection. One such system is described in S. E. Chen, "Quicktime VR—An Image-Based Approach to Virtual Environment Navigation", Proc. of SIGGRAPH 95, (8):29–38, August (1995). The article by L. McMillan and G. Bishop, "Plenoptic Modeling: An Image-Based Rendering System", Computer Graphics: Proc. of SIGGRAPH, August 1995, pp. 39–46, also describes a traditional pan-and-tilt system. This type of system has two serious drawbacks, however, one being the obvious disadvantages associated with a device having critical moving parts, and the second being the significant amount of time required to make a full rotation in order to view the surrounding world. This time limitation makes such a device unsuitable for real-time applications.

Another approach to increasing the field of view in an imaging system is by employing a so called "fish eye" lens as is disclosed in E. L. Hall et al., "Omnidirectional Viewing Using a Fish Eye Lens", SPIE Vol. 728 Optics, Illumination, and Image Sensing for Machine Vision (1986), p. 250. Since the fish eye lens has a very short focal length, the field of view may be as large as a hemisphere. The use of such lenses in an imaging system is problematic, however, in that they are significantly larger and more complex than conventional lenses. Moreover, it has been difficult to develop a fish eye lens with a fixed viewpoint for all points of the relevant scene. U.S. Pat. No. 5,185,667 to Zimmerman, and U.S. Pat. No. 5,359,363 to Kuban et al. are also directed to the use of fish eye lenses to replace conventional pan and tilt mechanisms, and accordingly suffer from the same disadvantages.

Other prior art devices have used reflecting surfaces to increase the field of view. One such prior art device is disclosed in V. S. Nalwa, "A True Omni-Directional Viewer", AT&T Bell Laboratories Technical Memorandum, BL0115500-960115-01, January 1996. Nalwa discloses the use of multiple planar reflecting surfaces in conjunction with multiple charge coupled device ("CCD") cameras to obtain a 360 degree panoramic image of a 50 degree band of a hemispherical scene. Specifically, in Nalwa, four planar mirrors are arranged in the shape of a pyramid, with one camera being positioned above each of the four planar reflecting sides, and with each camera viewing slightly more than 90 degrees by 50 degrees of the hemispherical scene. This system suffers from the serious drawback of requiring multiple sensors to capture a 360-degree image. In addition, this system suffers from the inherent problems associated with distortion at the "seams" when the separate images are combined to provide a full 360 degree view.

Curved reflective surfaces have also been used in conjunction with image sensors. Both Yagi et al., "Evaluating Effectivity of Map Generation by Tracking Vertical Edges in Omnidirectional Image Sequence", IEEE International Conference on Robotics and Automation, June 1995, p. 2334, and Yagi et al., "Map-Based Navigation for a Mobile Robot With Omnidirectional Image Sensor COPIS", IEEE Transactions on Robotics and Automation, Vol. II, No. 5, Oct. 1995, disclose a conical projection image sensor (COPIS) which uses a conical reflecting surface to gather images from the surrounding environment, and processes the information to guide the navigation of a mobile robot. Although the COPIS is able to attain viewing in 360 degrees, it is not a true omnidirectional image sensor because the field of view is limited by the vertex angle of the conical mirror and by the viewing angle of the camera lens. Furthermore, the COPIS does not have a single viewpoint, but instead has a locus of viewpoints lying on a circle. This locus of multiple viewpoints causes distortion in the captured images, which cannot be eliminated to obtain pure perspective images.

Yamazawa et al., "Obstacle Detection With Omnidirectional image Sensor Hyperomni Vision", IEEE International Conference on Robotics and Automation, October 1995, p. 1062, discloses a purported improvement in the COPIS system which involves the use of a hyperboloidal reflecting surface in place of a conical surface. As discussed therein, the rays of light which are reflected off the hyperboloidal surface, no matter where the point of origin, will all converge at a single point, thus enabling perspective viewing.

Although the use of a hyperboloidal mirror is advantageous in that it enables full perspective image sensing, because the rays of light which make up the reflected image converge at the focal point of the reflector, positioning of the sensor relative to the reflecting surface is critical, and any disturbance will impair the image quality. Further, the use of a perspective-projection model inherently requires that as the distance between the sensor and the mirror increases, the cross-section of the mirror must increase. Therefore, practical considerations dictate that in order to keep the mirror at a reasonable size, the mirror must be placed close to the sensor. This in turn causes complications to arise with respect to the design of the image sensor optics. In addition, mapping sensed image to usable coordinates requires complex calibration due to the nature of the converging image. A further drawback is that the relative positions of the mirror and the optics cannot be changed while maintaining a single viewpoint. Thus, a hyperboloidal mirror system cannot take advantage of the relative movement of the mirror and optics to adjust the field of view of the system, while maintaining a single viewpoint.

Prior to Yamazawa et al., U.S. Pat. No. 3,505,465 to Donald Rees also disclosed the use of a hyperboidal reflecting surface. Accordingly, the Rees disclosure also suffers from the same drawbacks as that of Yamazawa et al.

The above-described prior art devices fail in one of two ways. They either fail to provide a truly omnidirectional imaging apparatus that is capable of sensing a scene from a single viewpoint, making it impossible to provide distortion-free images with the apparatus, or they provide apparatus that require complex calibration and implementation.

SUMMARY OF THE INVENTION

The drawbacks of the prior art, as discussed above, are substantially solved by the present invention, which in one aspect is an omnidirectional imaging apparatus for sensing an image of a scene from a single viewpoint that includes a truncated, substantially paraboloid-shaped reflector positioned to orthographically reflect principal rays of electromagnetic radiation radiating from the scene. The paraboloid-shaped reflector has a focus coincident with the single viewpoint of the omnidirectional imaging apparatus. The omnidirectional imaging apparatus also includes telecentric means, optically coupled to the paraboloid-shaped reflector, for substantially filtering out principal rays of electromagnetic radiation which are not orthographically reflected by the paraboloid-shaped reflector. The omnidirectional imaging apparatus further includes one or more image sensors positioned to receive the orthographically reflected principal rays of electromagnetic radiation from the paraboloid-shaped reflector, thereby sensing the image of the scene.

The paraboloid-shaped reflector of the present invention may be either convex or concave. The telecentric means may include a telecentric lens, a telecentric aperture, or a collimating lens.

Preferably, the paraboloid-shaped reflector comprises a substantially paraboloidal mirror having a surface which substantially obeys the equation expressed in cylindrical coordinates:

$$z = \frac{h^2 - r^2}{2h},$$

z being an axis of rotation of the surface, r being a radial coordinate, and h being a constant. As the equation represents a symmetrical surface of rotation, the shape of the surface is not a function of the angular coordinate $\phi$.

In a preferred embodiment of the invention, the one or more image sensors comprise one or more video cameras. These video cameras may employ one or more charge-coupled devices or one or more charge injection devices. Alternatively, the one or more image sensors may comprise photographic film. In another preferred embodiment, at least one image sensor has a non-uniform resolution to compensate for the non-uniform resolution of the image reflected from the paraboloid-shaped reflector.

Preferably, the paraboloid-shaped reflector comprises a mirror truncated at a plane which includes the focus of the paraboloid-shaped reflector and which is perpendicular to the axis passing through the focus and the vertex of the paraboloid-shaped reflector.

In an exemplary embodiment, the paraboloid-shaped reflector is mounted on a fixed base and the one or more image sensors are mounted on a movable base, whereby movement of the one or more image sensors produces a changing field of view. Alternatively, the paraboloid-shaped reflector may be mounted on a movable base and the one or more image sensors may be mounted on a fixed base, whereby movement of the paraboloid-shaped reflector produces a changing field of view. In each of these embodiments, it is also preferred that a zoom lens be provided for optically coupling the one or more image sensors and the paraboloid-shaped reflector.

In a further exemplary embodiment, the one or more image sensors provide an image signal representative of the image of the scene. An image signal processing apparatus is coupled to the one or more image sensors, which converts the image signal from the image sensors into image signal data. The image signal processing apparatus then maps the image signal data into a Cartesian-coordinate system to produce a perspective image or into a cylindrical-coordinate system to produce a panoramic image. The image signal processing may include interpolation means for providing interpolated image data, whereby the interpolated image data and the image signal data are combined to form a digital image. Advantageously, the image processing apparatus may further include means for zooming in on a preselected portion of the digital image to thereby provide an enlarged image of the preselected portion from a predetermined focal distance.

In a preferred arrangement, the omnidirectional imaging apparatus comprises at least one lens optically coupling the one or more image sensors and the paraboloid-shaped reflector. This coupling lens may be a zoom lens, a microscope objective, or a field-flattening lens. Advantageously, the field-flattening lens has a field curvature approximately opposite to the field curvature of the paraboloid-shaped reflector. Preferably, the field-flattening lens is either a plano-concave lens or an aplanatic, meniscus lens.

In yet another preferred arrangement, the omnidirectional imaging apparatus is used to image a substantially spherical scene by using two truncated, substantially paraboloid-shaped reflectors positioned to orthographically reflect principal rays of electromagnetic radiation radiating from two complementary hemispherical scenes. The two paraboloid-shaped mirrors are positioned to share a common paraboloidal axis. In addition, when the two paraboloid-shaped reflectors are convex, they are positioned back-to-back along their planes of truncation, such that they share a common focus point. When the two paraboloid-shaped reflectors are concave, they are positioned such that their vertexes coincide.

In a further exemplary embodiment of the present invention, a plurality of beam splitters are provided for splitting the orthographically reflected principal rays of electromagnetic radiation from the paraboloid-shaped reflector into a plurality of ray bundles. In this embodiment, a plurality of image sensors is required, with each image sensor positioned to receive at least one of the plurality of ray bundles, and thereby sensing a portion of the image of the scene.

In yet a further exemplary embodiment, a plurality of dichroic beam splitters is provided for splitting the orthographically reflected principal rays of electromagnetic radiation from the paraboloid-shaped reflector into a plurality of monochromatic principal rays of electromagnetic radiation. As in the previous embodiment, a plurality of image sensors is required, with each image sensor positioned to receive at least one of the plurality of monochomatic principal rays of electromagnetic radiation, and thereby sensing at least one monochromatic image of the scene.

In accordance with the pioneering nature of the present invention, a method for sensing an image of a scene from a single viewpoint is also provided. In an exemplary embodiment, the method includes the steps of:

(a) orthographically reflecting principal rays of electromagnetic radiation radiating from the scene on a truncated, substantially paraboloid-shaped reflector such that the single viewpoint of the omnidirectional imaging method coincides with a focus point of the paraboloid-shaped reflector;

(b) telecentrically filtering out a substantial portion of any principal rays of electromagnetic radiation which are not orthographically reflected by the paraboloid-shaped reflector; and (c) sensing the image of the scene by sensing the orthographically reflected principal rays of electromagnetic radiation from the paraboloid-shaped reflector with one or more image sensors.

In a further exemplary embodiment, a method for omnidirectionally sensing images of a scene from a single viewpoint is provided, which includes:

(a) mounting a truncated, substantially paraboloid-shaped reflector on a fixed base;

(b) mounting one or more image sensors on a movable base;

(c) orthographically reflecting principal rays of electromagnetic radiation radiating from the scene on the substantially paraboloid-shaped reflector such that the single viewpoint of the omnidirectional imaging method coincides with a focus point of the paraboloid-shaped reflector;

(d) telecentrically filtering out a substantial portion of any principal rays of electromagnetic radiation which are not orthographically reflected from the paraboloidal-shaped reflector;

(e) moving the movable base to a first position;

(f) sensing a first image of the scene having a first field of view by sensing the orthographically reflected principal rays of electromagnetic radiation from the paraboloidal-shaped reflector with the one or more image sensors;

(g) moving the movable base to a second position different from the first position; and (h) sensing a second image of the scene having a second field of view by sensing the orthographically reflected principal rays of electromagnetic radiation from the paraboloidal-shaped reflector with the one or more image sensors.

Alternatively, instead of mounting the paraboloid-shaped reflector on a fixed base and mounting the image sensors on a movable base, the paraboloid-shaped reflector may be mounted on a movable base and the image sensors may be mounted on a fixed base. Preferably, the above-described method also includes the step of optically coupling the paraboloid-shaped reflector and the image sensors with a zoom lens, which may be used to magnify an area of interest in the scene.

BRIEF DESCRIPTION OF THE DRAWINGS

Exemplary embodiments of the present invention will now be described in detail with reference in the accompanying drawings in which:

FIG. 1A is a side view of an exemplary embodiment of an omnidirectional imaging apparatus;

FIG. 1B is a side view of an alternate embodiment in which a paraboloid-shaped reflector is connected to an image sensor by a transparent support;

FIG. 2 is an isometric view of a paraboloid-shaped reflector mounted on a base plate;

DETAILED DESCRIPTION

Figure 3:
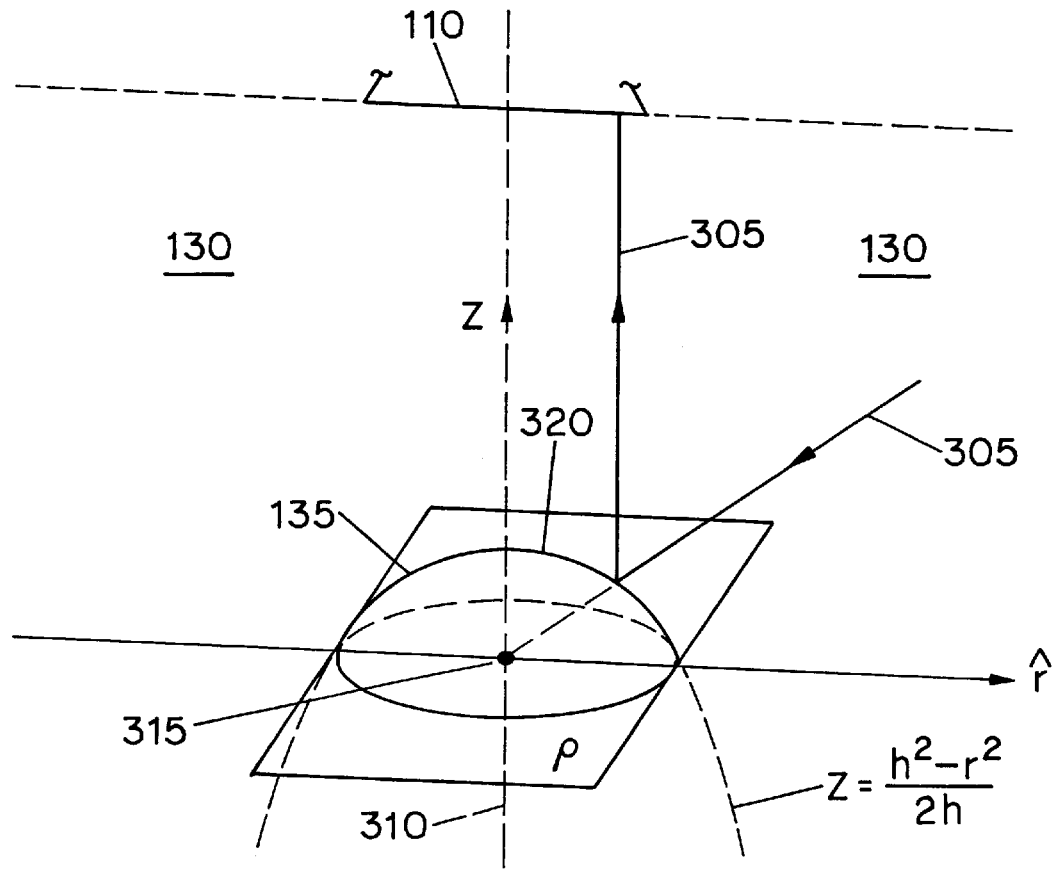
FIG. 3 is a partially isometric view of a paraboloid-shaped reflector mapped into a cylindrical coordinate system.

FIG. 1A illustrates an omnidirectional imaging apparatus 100 according to an exemplary embodiment of the present invention. A convex paraboloid shaped reflector 135, which is mounted on a base plate 140, is positioned to orthographically reflect an image of a substantially hemispherical scene 130. An image sensor 110, such as a commercially available Sony 3CCD color video camera device 111 having a telecentric lens or a magnifying lens 112 and a telecentric aperture 113, is positioned to receive the orthographic reflection of the image. The telecentric lens or aperture functions to filter out all rays of light which are not perpendicular to the plane of the lens or aperture, i.e., background light which does not form part of the orthographic reflection of the hemispherical scene.

Although the description herein is with regard to visible light, the present invention has equal application to other forms of electromagnetic radiation such as ultraviolet light or infrared light.

In an alternate exemplary embodiment of the imaging apparatus 100 according to the invention shown in FIG. 1B, the paraboloid-shaped reflector may be coupled to the image sensor by a transparent support 136, such as a length of clear tubing.

Referring again to FIG. 1A, the video camera 110 generates an analog video signal representative of the orthographically reflected image which is sent through cable 150. The video signal is converted to a digital signal by digitizer 120, which is a commercially available NTSC video signal analog-to-digital converter.

The digital signal is then sent through a cable 155 to a general purpose computer 125, such as a DEC Alpha 3000/600 workstation. As will be explained in further detail, the computer 125 is programmed to allow the user to view any desired portion of the hemispherical scene, to zoom in on a selected portion of the scene, or to pan the scene in any desired manner.

The image sensor 110 may simply be a still or motion picture photographic camera using conventional photographic film. The image sensor 110 may also be a camcorder or video camera 116 which provides a digital video signal output, which can be provided directly to the computer 125 without the need for the analog-to-digital converter 120.

FIG. 2 shows an isometric view of the paraboloid-shaped reflector 135, which extends from base 140 from which it is formed. The reflector 135 may comprise a paraboloid-shaped plastic body coated with a thin layer 145 of highly reflective metal, such as aluminum or silver. Alternatively, the reflector 135 may comprise a paraboloid-shaped, polished metal body. For this latter embodiment, a metal such as stainless steel may be used.

FIG. 3 illustrates in greater detail, the preferred geometry of the paraboloid-shaped reflector 135, as well as the orthographic reflection of the image of the substantially hemispherical scene 130 onto the image sensor 110. The reflector 135 of FIG. 3 is defined in cylindrical coordinates, r, $\phi$ and z, as substantially obeying the equation $$z = \frac{h^2 - r^2}{2h}, \qquad (1)$$

where z is the axis of rotation, r is the radial coordinate, and h is a constant. The z axis coincides with the optical axis of the imaging arrangement, and a focus point 315 of the paraboloid defined by equation (1) coincides with the origin of the coordinate system. The reflector 135 of FIG. 3 is truncated at a plane p which is substantially perpendicular to the z axis 310 and which includes the focus point 315 of its paraboloidal surface.

All incoming rays 305 that would otherwise pass through the focus point 315, are orthographically reflected towards the image sensor 110 by the reflecting paraboloidal surface. Thus, the focus point 315 is coincident with the single viewpoint from which the substantially hemispherical scene 130 is viewed. The image sensor 110 is positioned along the optical axis 310 of the imaging system and the photosensitive surface thereof is perpendicular to the optical axis. The use of orthographic reflection to enable viewing of a substantially hemispherical scene from a single viewpoint is an advantageous feature of the present invention.

Figure 4:
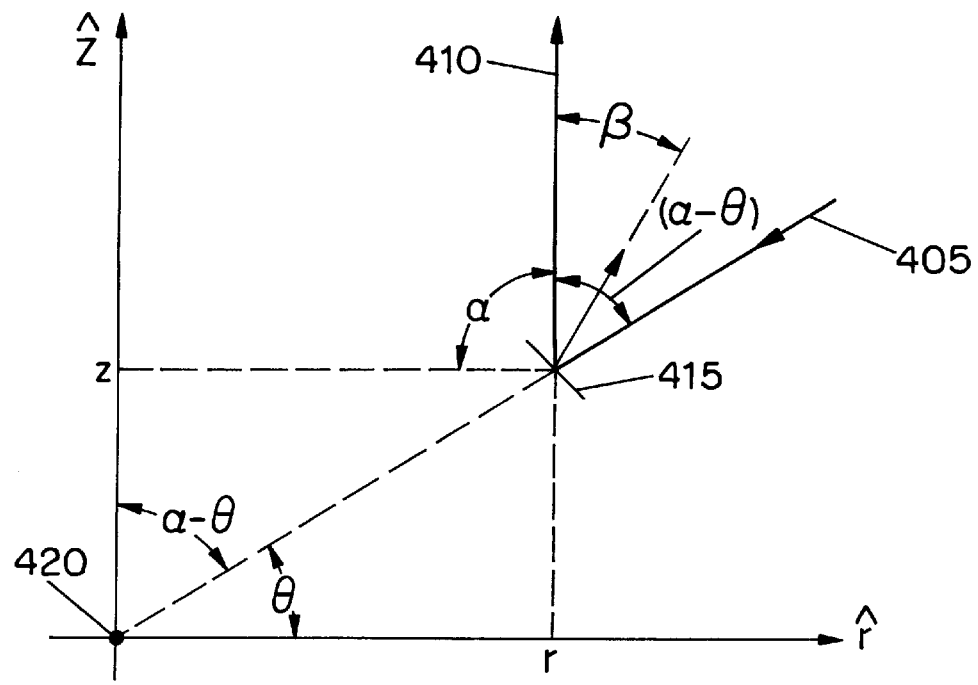
FIG. 4 is a geometric representation of an orthographic reflection from a curved reflecting surface.

That orthographic reflection enables viewing from a single viewpoint can be demonstrated by reference to FIG. 4. In FIG. 4, z and r are perpendicular cylindrical coordinates for a given value of $\phi$, the angular coordinate. The angle of an incoming ray 405 relative to the r̂ axis is $\theta$. The incoming ray 405 is orthographically reflected by the reflecting surface 415 as an outgoing ray 410.

To have a single viewpoint 420, any incoming ray must satisfy $$\tan(\theta) = z/r, \qquad (2)$$

and for orthographic reflection, all rays must be reflected at an angle $$\alpha = \pi/2, \qquad (3)$$

where $\alpha$ is the angle between the outgoing ray 410 and the axis. For these two constraints to be satisfied, and for the angle of incidence to equal the angle of reflection, it is clear that the angle, $\beta$, between the reflected ray 410 and the normal direction of the surface at the point of reflection, n̂, must equal $$\beta = \frac{\alpha - \theta}{2} \text{ or } \beta = \frac{\pi - 2\theta}{4}, \quad (4)$$

which can also be expressed as $$\tan 2\beta = \frac{\tan\alpha - \tan\theta}{1 + \tan\alpha \tan\theta} = \frac{2\tan\beta}{1 - \tan^2\beta}. \quad (5)$$

Finally, the slope of the reflecting surface 415 in the ẑ-r̂ plane at the point of reflection is $$z' = \frac{dz}{dr} = -\tan\beta. \quad (6)$$

Substituting (6) and (4) into (5) yields $$\frac{-2\frac{dz}{dr}}{1 - \left(\frac{dz}{dr}\right)^2} = \frac{r}{z}. \quad (7)$$

The quadratic expression of equation (7) can be solved to obtain two solutions for $$\frac{dz}{dr},$$

but to avoid self occlusion by the reflecting surface, the slope of the curve in the right quadrant is made negative (i.e., the surface is convex). The result is $$\frac{dz}{dr} = \frac{z}{r} - \sqrt{1 + \left(\frac{z}{r}\right)^2}. \quad (8)$$

If a=z/r, the above expression reduces to $$a + \sqrt{1 + a^2} = \frac{h}{r}, \quad (9)$$

where h is a constant of integration. Substituting z=ra into equation (9) yields equation (1).

Thus, there exists a curve, which when rotated about the z axis, generates a surface that will allow orthographic reflection of a substantially hemispherical scene from a single viewpoint. This curve is the parabola defined by equation (1), which has a single viewpoint that is coincident with the focus 420 of the parabola.

In addition to providing viewing of a substantially hemispherical scene from a single viewpoint, the omnidirectional imaging apparatus in accordance with the present invention enables viewing of any portion of the scene, enables zooming in on a selected portion, and enables panning of the scene, all with respect to the single viewpoint and without requiring image reconstruction or complex frame transformation.

Figure 5:
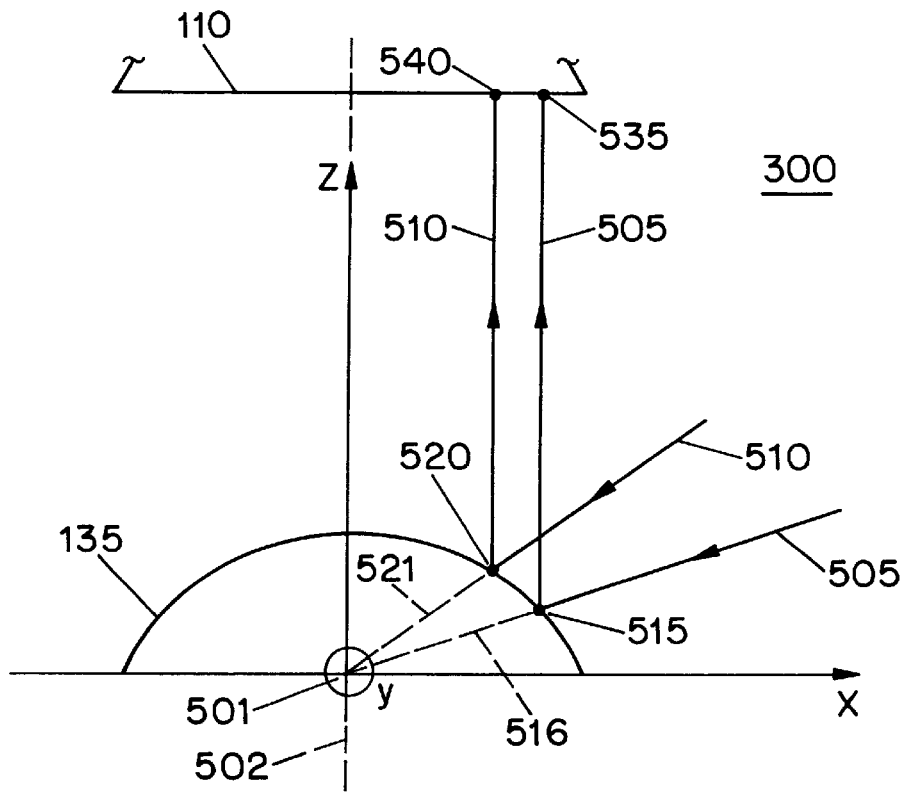
FIG. 5 is an illustration of orthographic reflection from a substantially paraboloid-shaped reflector to an image sensor.

FIG. 5 illustrates how a portion of the substantially hemispherical scene is viewed by the image sensor from a single viewpoint. FIG. 5 also illustrates how a truncated convex substantially paraboloid-shaped reflector 135 is mapped into a Cartesian coordinate system. The optical axis 502 of the imaging arrangement is coincident with the z axis, and the focus 501 of the substantially paraboloid-shaped reflector 135 is located at the origin. Incoming rays 505, 510 from a portion of the scene 300 being viewed intersects the reflecting surface at points 515 and 520, which can be defined by their respective x and y coordinates. Point 515 and 520 lie along imaginary radial lines 516 and 521, respectively, which originate at the viewpoint of the scene, i.e., the focus 501 of the paraboloid-shaped reflector. Since these rays are orthographically reflected toward the image sensor 110, which has a planar light-sensitive surface perpendicular to the z-axis, the projected rays will intersect the light-sensitive surface at the same respective x and y coordinates. Only the z coordinate will change. Accordingly, there is a one-to-one correspondence between the x-y coordinate of the point of intersection with the reflector 135 of the orthographically projected ray, and the x-y coordinate of the point at which that orthographically projected ray intersects the planar light-sensitive surface of the image sensor 110.

In a preferred arrangement, the image sensor 110 includes a planar charge-coupled device ("CCD") image sensor having an array of light sensing cells. Each cell senses the intensity of light at its particular location in the array. Therefore, with a one-to-one correspondence, the image signals produced by the CCD cells which cover a particular range of x-y coordinates in the grid is representative of the rays which are orthographically reflected from the reflecting surface 135 at points within the same range of x-y coordinates. Thus, mapping of the image into a Cartesian-coordinate system is a simple task for persons skilled in the art.

With the one-to-one correspondence explained above in mind, FIG. 6 illustrates a technique for zooming in on any selected portion of the substantially hemispherical scene. The reflector 135 is positioned relative to orthogonal x, y and z axes in the same manner as in FIG. 5. In order to zoom in at a focal distance f on a selected portion of the scene centered around a point 550, with a specified size, only the image signals of the CCD cells located with the same range of x-y coordinates as the region of the reflecting surface projecting the selected portion of the scene are selected for magnification and viewing.

Figure 6:
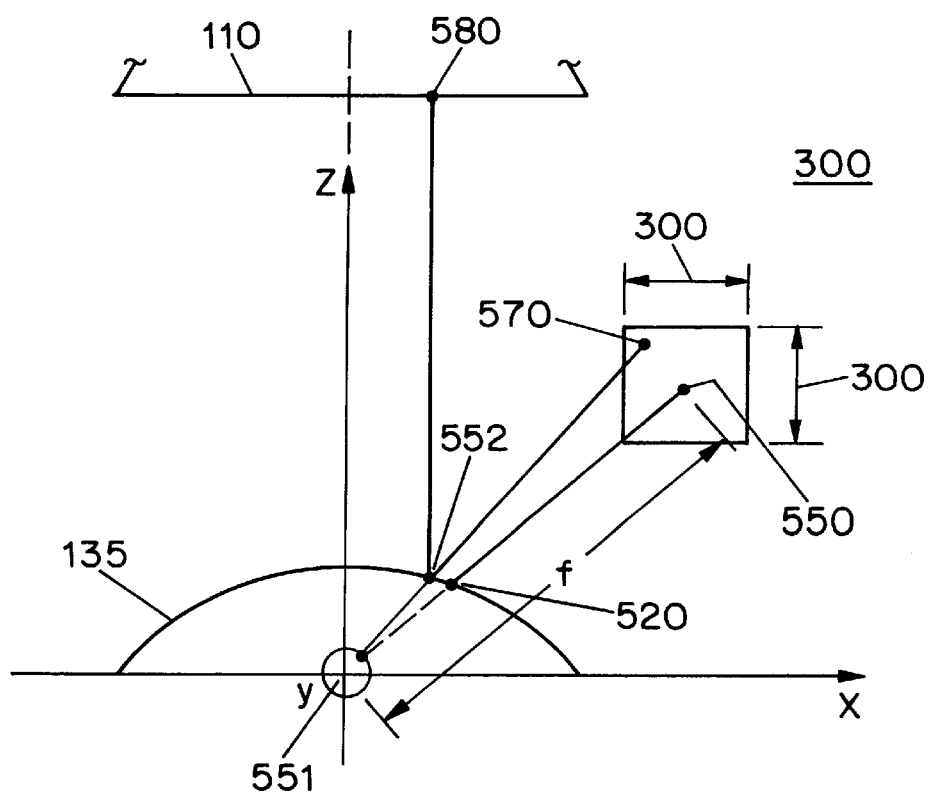
FIG. 6 illustrates how any selected portion of a hemispherical scene can be viewed from the single viewpoint using a paraboloid-shaped reflector.

More particularly, to determine the appropriate light intensity for point 570 in the selected portion of the scene, the light intensity signal generated by the CCD cell which lies at 580 is chosen. As shown in FIG. 6, a line segment drawn between point 570 and focus point 551 intersects the reflector 135 at point 552. The light intensity at point 570 is set equal to that represented by the image signal generated by the CCD cell at 580 which is located at the x-y coordinate on the grid nearest to the x-y coordinate of point 552. The same is repeated for each CCD cell within the same range of x-y coordinates as the region of the reflecting surface projecting the selected portion of the scene. As a result of the orthographic reflection and the one-to-one correspondence described above, no image reconstruction or complex frame transformation is required.

A general purpose computer 125 can be readily programmed by one skilled in the art to perform the above steps to enable viewing of any portion of the hemispherical scene from a single viewpoint, and to also enable zooming in on any particular portion to provide an enlarged image of that portion. Furthermore, by designating successive points along the reflector, the hemispherical scene can be panned as if one were viewing the scene from a single viewpoint.

In the embodiment discussed above, it is readily apparent that as one zooms in on smaller portions of the scene, the number of CCD cells providing information to the computer 125 is reduced, and hence the granularity of the viewed image is increased. In a preferred embodiment, information about points in the scene which do not exactly correspond to CCD cells are more closely approximated by interpolation. A suitable interpolation program which may be executed on computer 125 is included in Appendix I to this specification. The program attached as Appendix I will map the sensed omnidirectional image to an ordinary perspective image that is suitable for display on computer 125. The program requires the user to input the name, center location, and radius of the omnidirectional image to be converted. The program also requires the user to input a name for the generated perspective image, as well as a focal length and size for the perspective image.

Thus, instead of simply choosing the image signal generated by the nearest CCD cell to represent portions of the image which do not precisely correspond to a CCD cell, the image for such scene portions is estimated by the appended program based on a suitable average of image signals generated by CCD cells which correspond to neighboring portions of the scene. Of course, more sophisticated interpolation programs known to those skilled in the art, such as those that are based on polynomial or temporal matching, may be used without departing from the scope of the invention, as defined by the claims herein.

Figure 9:
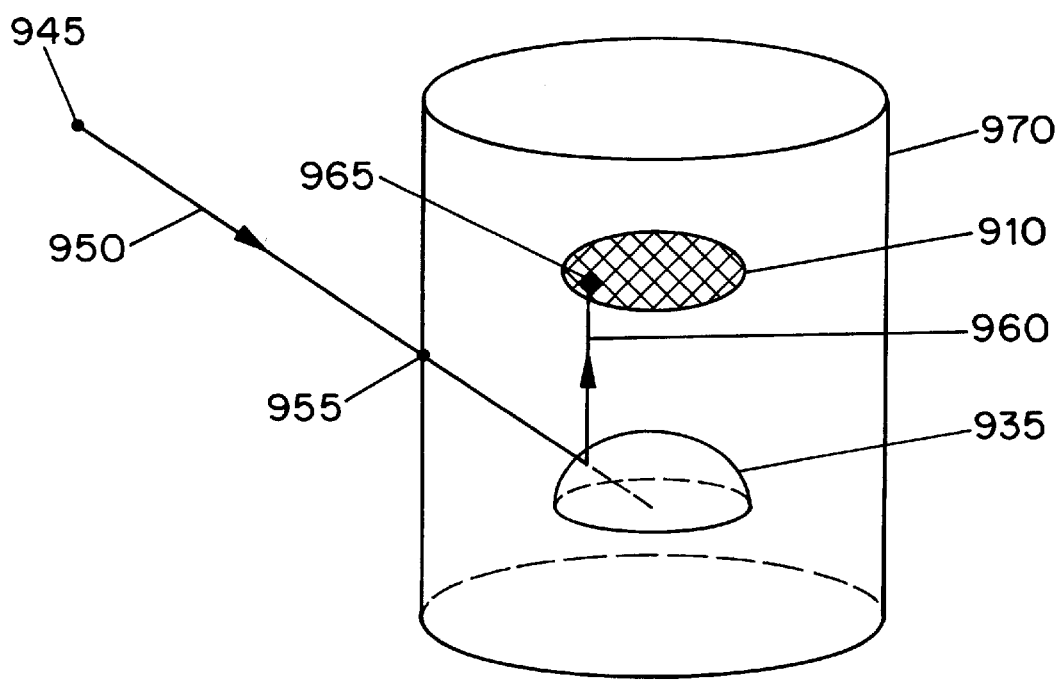
FIG. 9 illustrates the mapping of image data to cylindrical coordinates to enable production of a panoramic view.

In addition to the Cartesian-coordinate mapping that has been described, which produces a perspective image, a cylindrical-coordinate mapping may also be performed to achieve a panoramic image of the scene being viewed. Cylindrical-coordinate mapping will be described with reference to FIG. 9. In FIG. 9, a principal ray 950 from a point 945 in a scene strikes a paraboloid-shaped reflector 935 and is orthographically reflected toward an image sensor 910. The orthographically reflected ray 960 impinges the image sensor at sensing element 965. To map the point represented by sensing element 965 into cylindrical coordinates, a truncated cylinder 970 is imagined to surround the paraboloid-shaped reflector 935 and image sensor 910. The point represented by sensing element 965 is then traced back through rays 960 and 950, and the point of intersection 955 of the ray 950 with the truncated cylinder 970 is determined. Point 955 is then assigned the light intensity of sensing element 965. This same calculation is performed for each sensing element of the image sensor 910. The resultant collection of points (with appropriately assigned light intensities) located on the truncated cylinder 970 produces a panoramic image of the scene being viewed. This panoramic image can be viewed on a display by further mapping the truncated cylinder to a planar surface. This mapping is easily performed by those skilled in the art and can be visualized by imagining that the cylinder is cut length-wise and flattened out. Moreover, as those skilled in the art will readily appreciate, interpolation of image data as discussed above in relation to Cartesian-coordinate mapping may also be used with cylindrical-coordinate mapping.

In a preferred embodiment of the present invention, a ⅓ inch CCD is used with a 0.4 inch focal length paraboloid-shaped mirror truncated through its focus and having a 1.6 inch diameter. A collimating lens, such as Model No. P32921 from EDMUND SCIENTIFIC of Barrington, N.J., is used with an 8.5 inch focal-length imaging lens to optically couple the mirror to the CCD.

Figure 7:
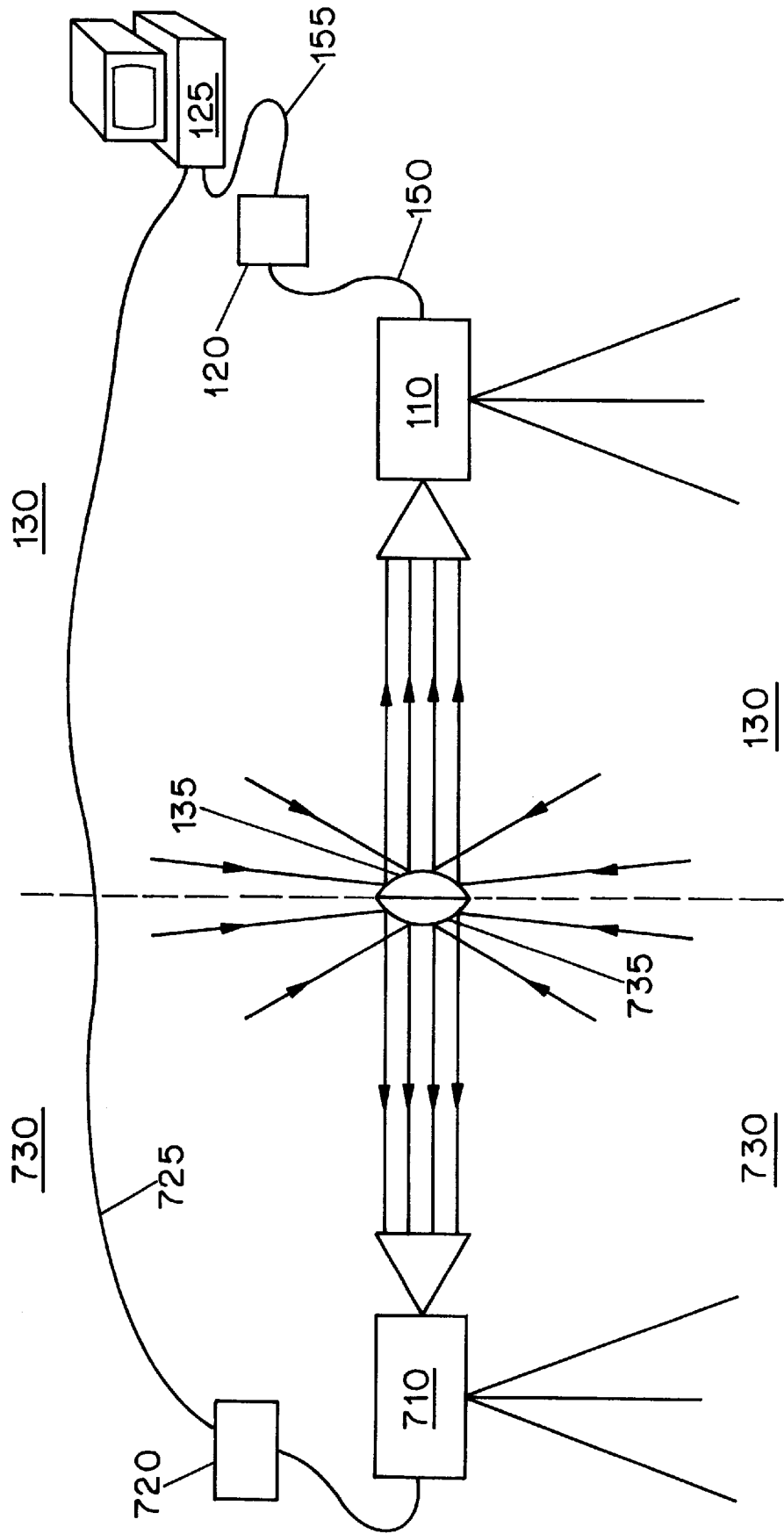
FIG. 7 is a side view of an omnidirectional imaging apparatus with two back-to-back substantially paraboloid-shaped reflectors and two image sensors.

In a further exemplary embodiment of the invention, the omnidirectional imaging apparatus includes an additional substantially paraboloid-shaped reflector 735 as shown in FIG. 7. The additional reflector is positioned to orthographically project an image of an additional hemispherical scene 730 which is complementary to the hemispherical scene 130 so that together they constitute a spherical scene. An additional image sensor 710 is positioned to receive the image orthographically projected by the additional reflector 735.

An image signal representative of the orthographic reflection of the additional reflector 735 is converted to a digital signal by converter 720 in the same manner as described above, and is sent to the same general purpose computer 125 via line 725.

Figure 8:
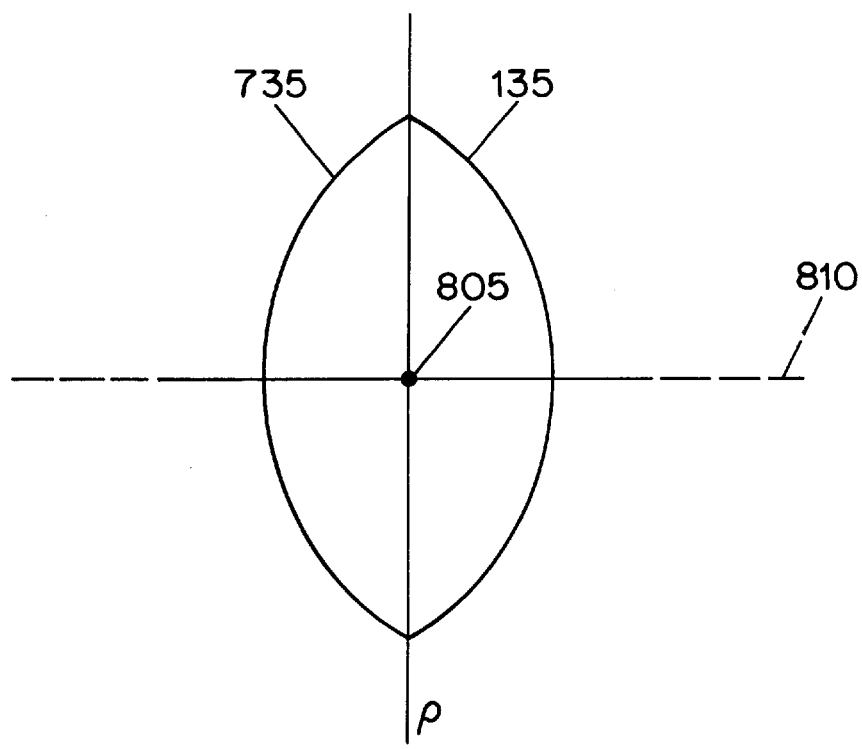
FIG. 8 is a cross-sectional view of two substantially paraboloid-shaped reflectors positioned back-to-back and having a common paraboloidal axis and a common focus.

As shown in FIG. 8, the reflectors 135 and 735 are positioned back-to-back, share a common axis of rotation 810, which is also the optical axis of the imaging apparatus, and a common focus 805, and are each truncated at a plane p which is substantially perpendicular to the axis of rotation 810 and which includes the focus 805.

Figure 10:
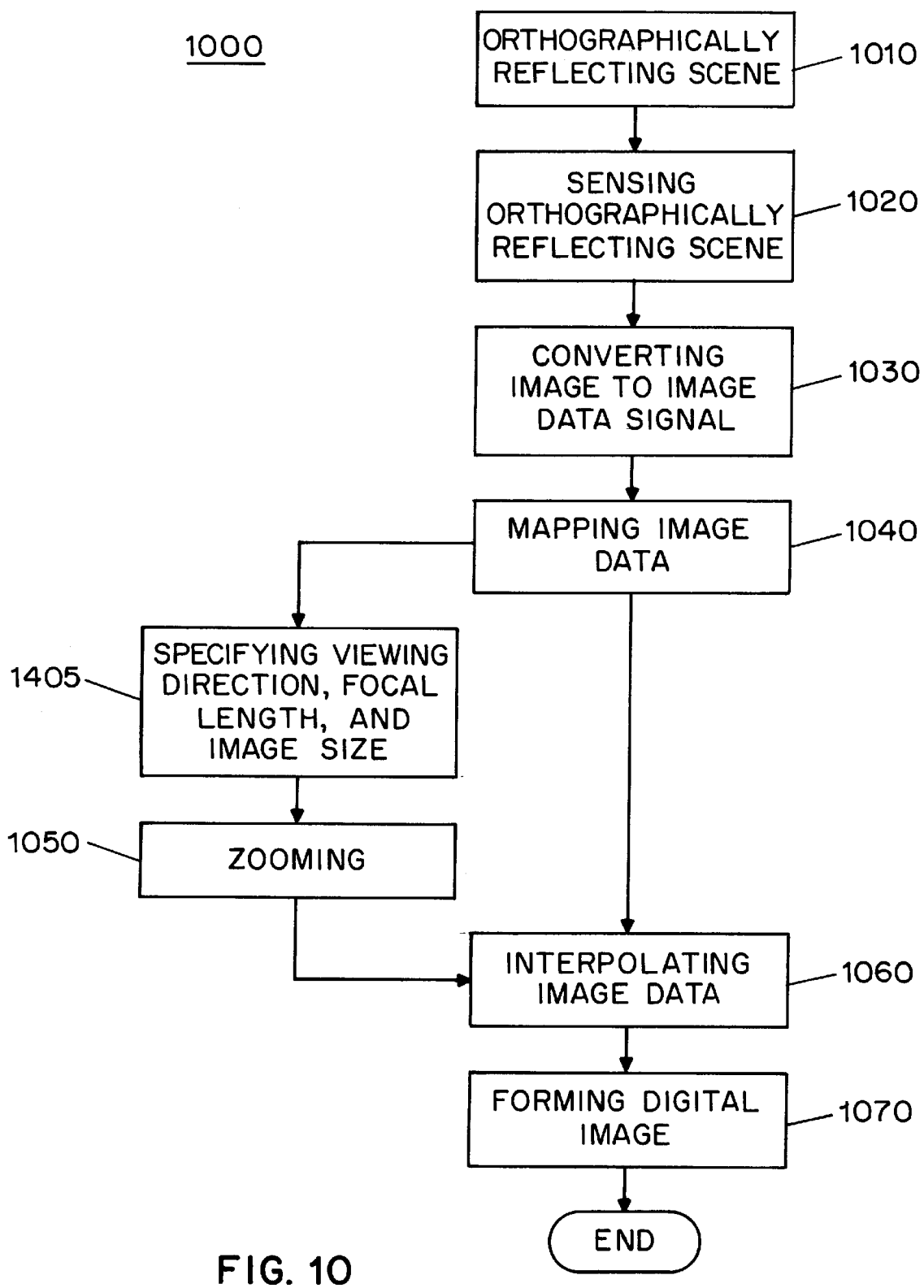
FIG. 10 is a flowchart of an exemplary embodiment of a method for sensing and processing an image of a substantially hemispherical scene from a single viewpoint.

Referring to FIG. 10, there is shown a flow chart 1000 illustrating a method for sensing an image of a substantially hemispherical or spherical scene from a single viewpoint according to an exemplary embodiment of the present invention. Flowchart 1000 shows the necessary steps for sensing the hemispherical scene from a single viewpoint. The method requires orthographically reflecting the substantially hemispherical scene 1010, and sensing the orthographically reflected image 1020.

The method may further include the steps of converting the image signal into image signal data 1030, mapping the image data into an appropriate coordinate system 1040, interpolating the image data 1060 to derive approximate values for missing image data, and forming a digital image 1070 from the mapped image data and from the interpolated image data. Advantageously the steps of specifying a viewing direction, a focal length, and an image size 1045 and zooming in 1050 on a selected portion of the image data may be performed before the interpolation step.

Thus far, the exemplary embodiments described have all utilized a "normal" paraboloid-shaped reflector. As used in this specification and the appended claims, the term "normal" in association with a paraboloid-shaped reflector refers to a paraboloid-shaped reflector that is truncated at a plane that passes through the focal point of the paraboloid-shaped reflector and that is substantially perpendicular to the paraboloidal axis of the paraboloid-shaped reflector. As used in this specification and the appended claims, the paraboloidal axis of a paraboloid-shaped reflector is the axis passing through the vertex and focal point of the paraboloid-shaped reflector. As described above, using a normal paraboloid-shaped reflector, one can image an entire hemisphere ($\pi$ steradians), or by placing two such reflectors back-to-back, a complete sphere ($2\pi$ steradians). FIGS. 11 to 15 show further exemplary embodiments of the omnidirectional imaging apparatus in which the paraboloid-shaped reflector may also take the form of various non-normal paraboloids.

Figure 11:
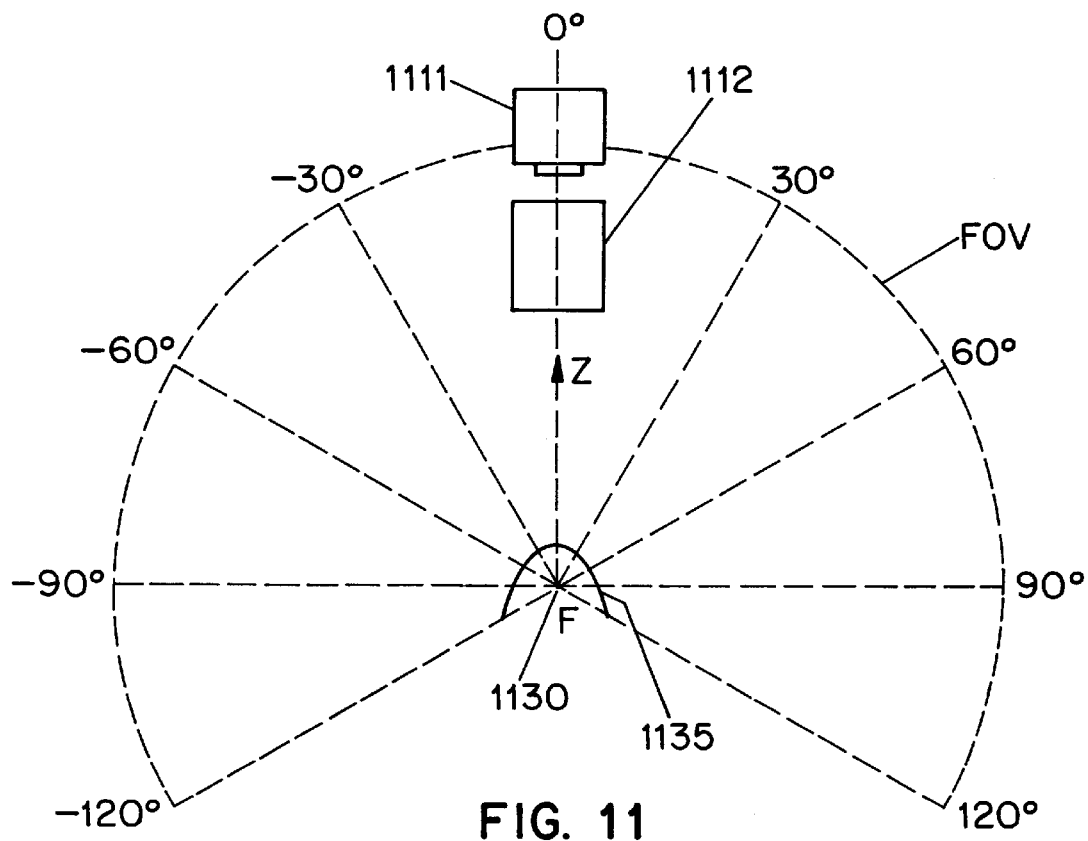
FIG. 11 is a side view of an embodiment of an omnidirectional imaging apparatus according to the present invention, which includes an extended paraboloid-shaped reflector.

FIG. 11 shows an omnidirectional imaging apparatus that is able to image a field of view ("FOV") greater than a hemisphere using only one camera 1111 and one paraboloid-shaped reflector 1135. In the embodiment of FIG. 11, the paraboloid-shaped reflector 1135 is an extended paraboloid that is obtained by cutting a suitable reflector with a plane that is normal to the axis of the paraboloid (z) but passes below the focal point 1130 of the paraboloid. Advantageously, because the paraboloid extends below its focal point, the paraboloid-shaped reflector is able to orthographically reflect rays from the hemisphere below its focal point. In the embodiment illustrated in FIG. 11, for example, the FOV covered by the paraboloid-shaped reflector is 240 degrees, or 75% of an entire sphere. Preferably, as shown in FIG. 11, the camera 1111 and the paraboloid-shaped reflector 1135 are coupled by optics 1112.

Figure 12:
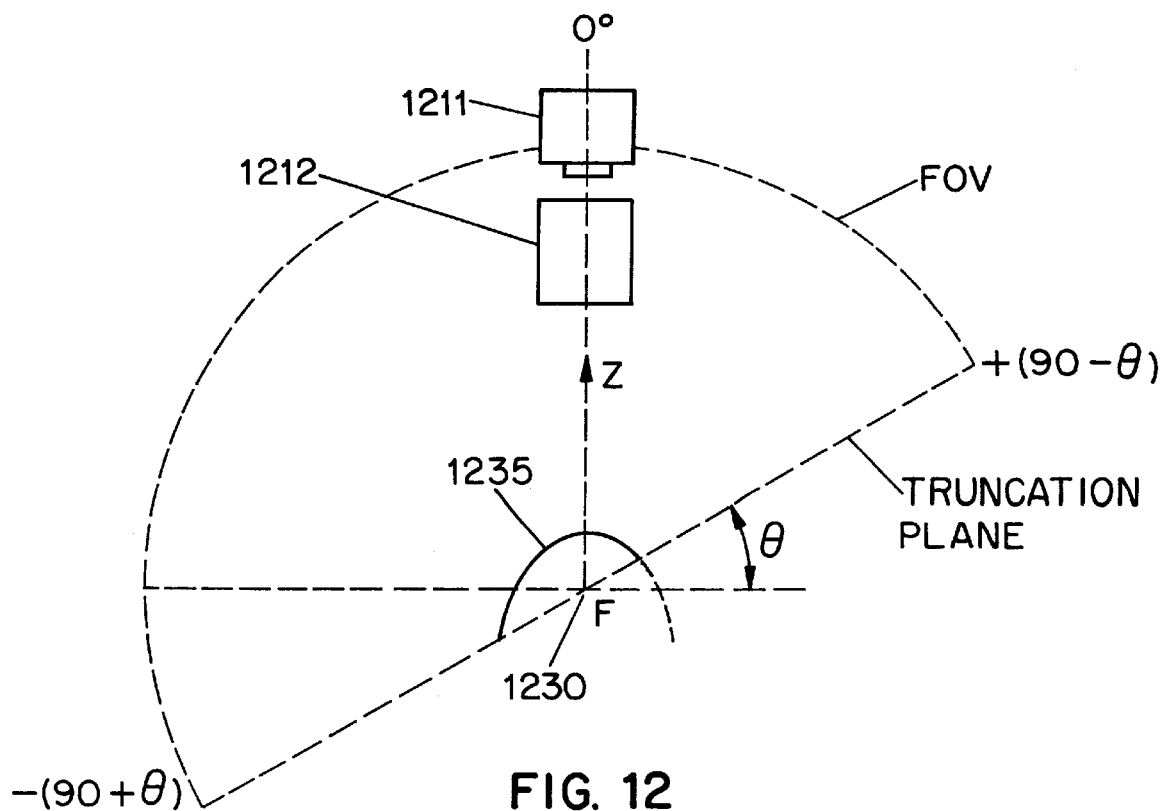
FIG. 12 is a side view of an embodiment of an omnidirectional imaging apparatus according to the present invention, which includes a paraboloid-shaped reflector truncated at a plane that is tilted with respect to the paraboloidal axis of the reflector.

FIG. 12 shows an omnidirectional imaging apparatus that may be used to image a FOV that is tilted with respect to the paraboloidal axis of the paraboloid-shaped reflector. The embodiment of FIG. 12 includes a camera 1211, optics 1212, and a paraboloid-shaped reflector 1235. The paraboloid-shaped reflector 1235 is truncated at a plane passing through the focus of the paraboloid-shaped reflector 1235 and tilted with respect to its paraboloidal axis (z). The FOV of this reflector is thus a tilted hemisphere, as shown by the dotted lines in FIG. 12. Although the embodiment in FIG. 12 shows the truncation plane passing through focus of the paraboloid, the invention is not limited to this embodiment. The truncation plane may also pass above the focus 1230 of the paraboloid (thereby resulting in a FOV smaller than a hemisphere), or the truncation plane may pass below the focus 1230 (thereby resulting in a FOV greater than a hemisphere).

Figure 13:
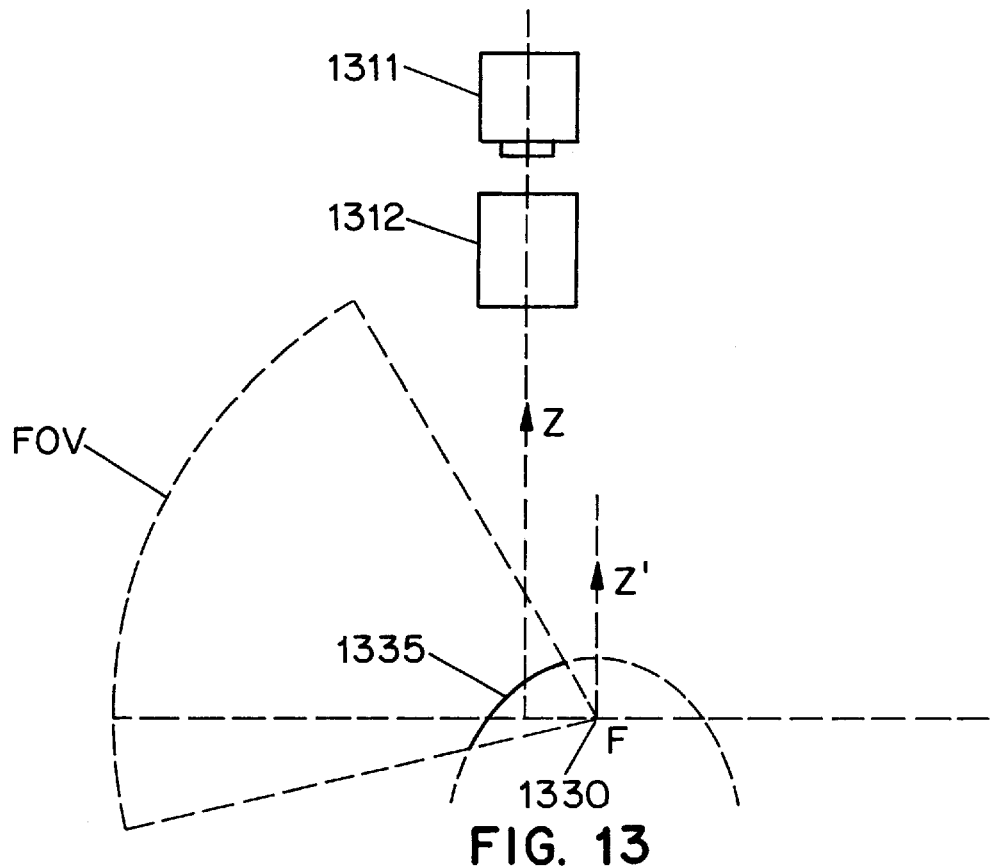
FIG. 13 is a side view of an embodiment of an omnidirectional imaging apparatus according to the present invention, which includes a paraboloid-shaped reflector that is larger than the imaging area of the image sensor.

FIG. 13 shows an omnidirectional imaging apparatus that may be used to image a FOV smaller than a hemisphere. The embodiment of FIG. 13 includes a camera 1311 coupled to a paraboloid-shaped reflector 1335 by optics 1312. In this embodiment, the paraboloid-shaped reflector 1335 is formed such that it is "larger" than the imaging area of the camera 1311. In this context, a paraboloid-shaped reflector is "larger" than the imaging area of a camera if the base of a normal paraboloid having the same shape as the reflector (i.e., having the same paraboloidal constant h as defined in equation (1)) is larger than the smallest dimension of the imaging area of the camera. Taking the case of a normal paraboloid for illustrative purposes, it is clear that when such a paraboloid is larger than the imaging area of a camera, only a FOV smaller than a full hemisphere is capable of being captured in the imaging area of the camera because the orthographically reflected rays at the outer edges of the paraboloid will not impinge on the imaging area. Advantageously, however, the image captured using such a paraboloid-shaped mirror has a higher resolution than a corresponding image captured using a smaller paraboloid. As shown in FIG. 13, the paraboloidal axis of the paraboloid-shaped reflector 1335 (z') may be shifted with respect to the optical axis (z) to obtain fields of view towards the horizon. In addition, the paraboloid-shaped reflector 1335 need not be a normal paraboloid, but may be truncated in accordance with the FOV to be imaged.

Figure 14:
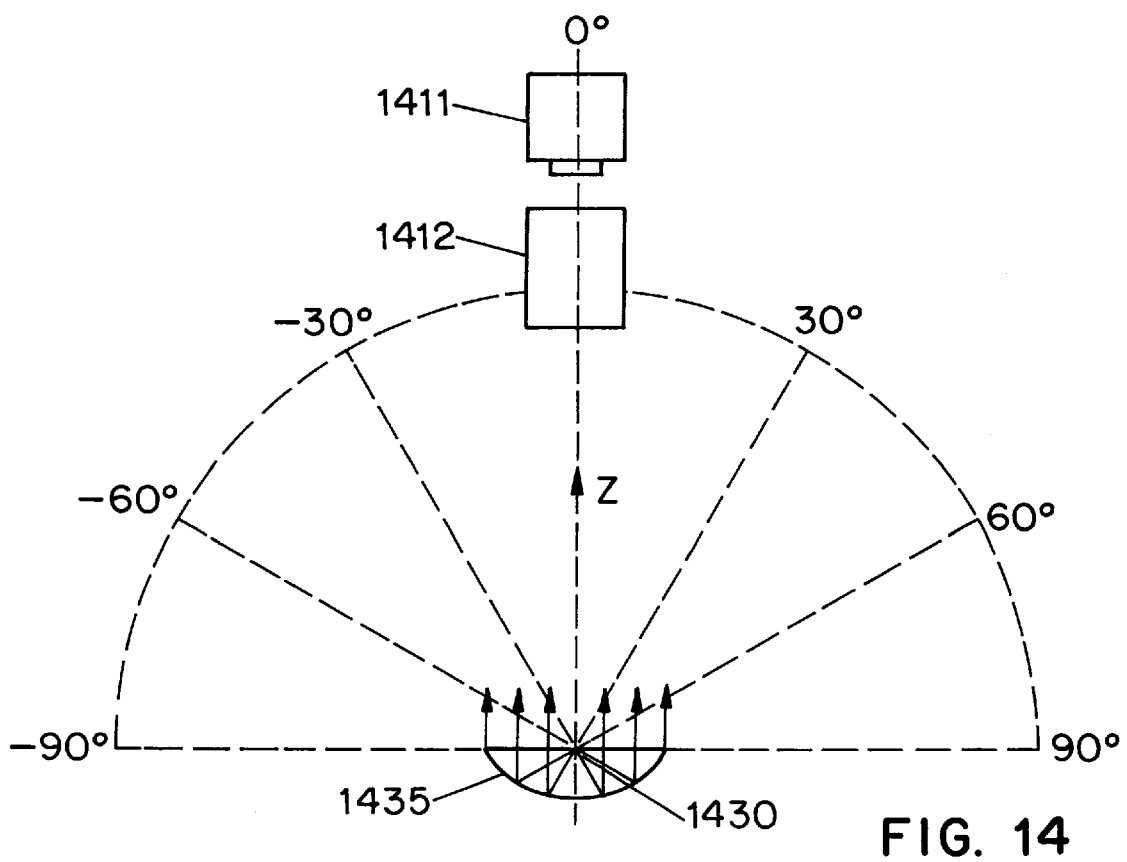
FIG. 14 is a side view of an embodiment of an omnidirectional imaging apparatus according to the present invention, which includes a concave paraboloid-shaped reflector.

Thus far, all of the embodiments discussed have comprised a convex paraboloid-shaped reflector. In FIG. 14, an embodiment of an omnidirectional imaging apparatus according to the present invention is shown that includes a camera 1411, optics 1412, and a concave paraboloid-shaped reflector 1435. A concave paraboloid-shaped reflector may be used in applications where the concealment of the reflector is desirable (as, for example, in outdoor applications where protection against weather is desirable). In the case of a concave paraboloid-shaped reflector, the paraboloidal image of the scene is "flipped," but the image continues to satisfy the single viewpoint constraint disclosed previously. Therefore, pure perspective images can be generated from the concave paraboloidal image, just as with the convex paraboloidal image. In the case of the concave paraboloid, however, at most a hemispherical field of view can be obtained with a single reflector. This hemispherical FOV is obtained by truncating the paraboloid with a plane that passes through the focal point 1435 of the paraboloid (the plane being either normal or, tilted with respect to the axis of the paraboloid (z)). Although a concave paraboloid that is truncated above its focal point may also be used, such a paraboloid is not desirable because it causes self obstruction of the image.

Figure 25:
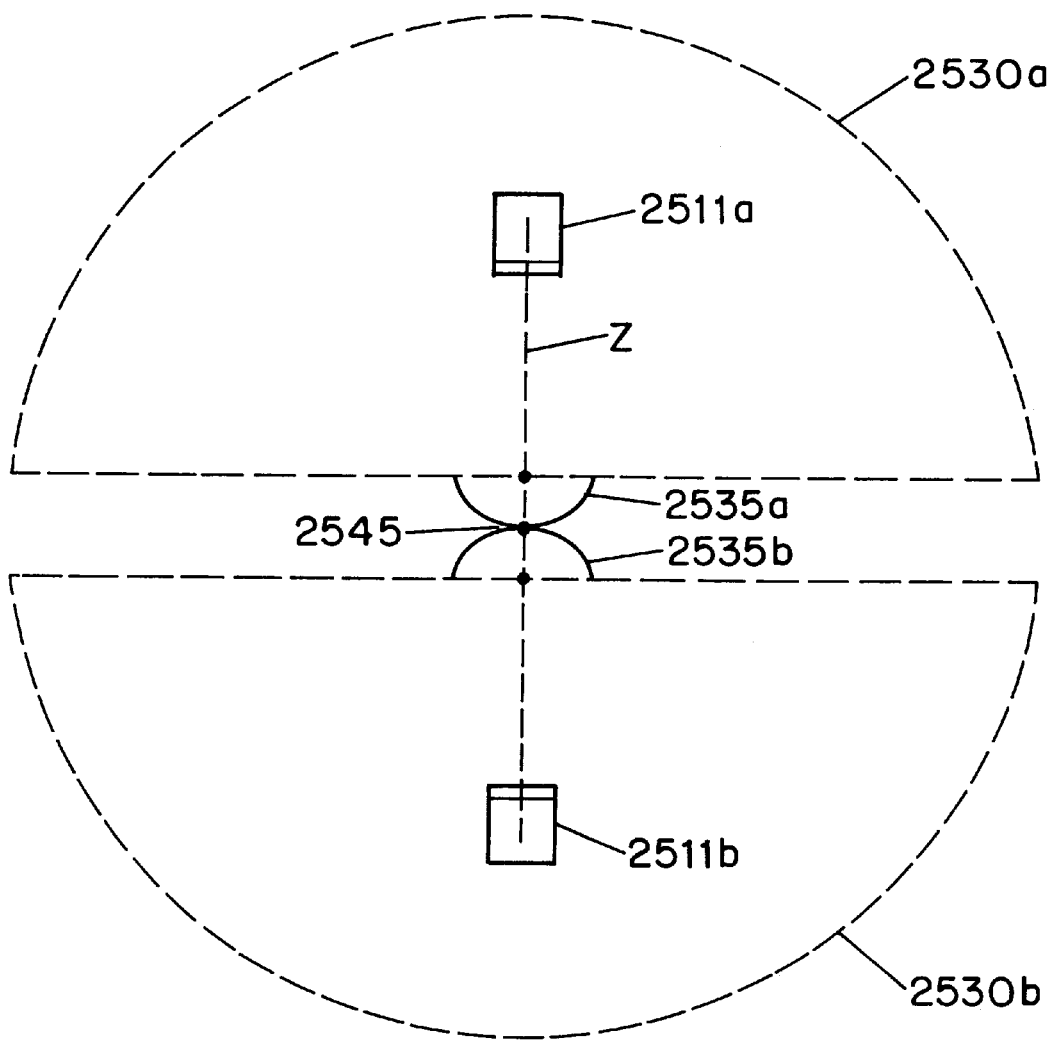
FIG. 25 is a side view of an embodiment of an omnidirectional imaging apparatus according to the present invention, which includes two concave paraboloid-shaped mirrors used to image a substantially spherical view.

As shown in FIG. 25, a FOV greater than a hemisphere may be obtained by using multiple concave paraboloid-shaped reflectors. In FIG. 25, two paraboloid-shaped reflectors, 2535a and 2535b, are positioned such that they share a common paraboloidal axis (z) and their vertexes 2545 coincide. Together with image sensors 2511a and 2511b, the two paraboloid-shaped reflectors 2535a and 2535b are able to image two hemispheres 2530a and 2530b, respectively. This system may be used advantageously when the reflectors are required to be recessed for concealment or protection. A disadvantage to using concave mirrors in this arrangement, instead of using convex mirrors in the arrangement of FIG. 7, is that a small blindspot, comprising the area between the truncation planes of the two reflectors, is inevitable.

Figure 15:
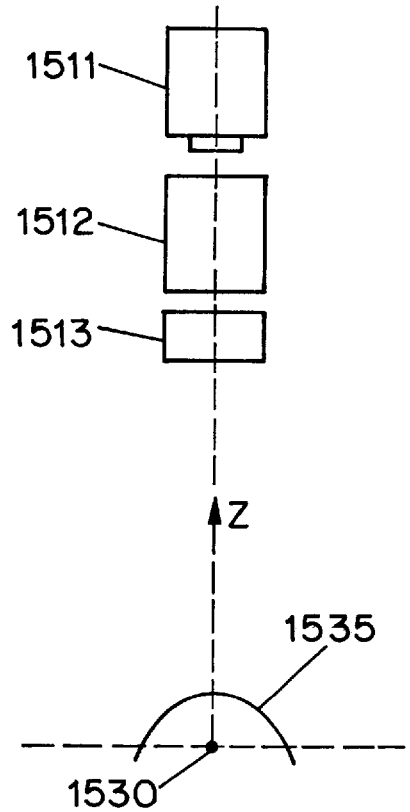
FIG. 15 is a side view of an embodiment of an omnidirectional imaging apparatus according to the present invention, which includes a zoom lens optically coupling a paraboloid-shaped reflector and an image sensor.

FIG. 15 shows an embodiment of an omnidirectional imaging system according to the present invention with zoom capabilities. The omnidirectional imaging system of FIG. 15 includes a paraboloid-shaped reflector 1535, a camera 1511, a zoom lens 1512, and relay optics 1513. (As used in this specification and the appended claims, relay optics and collimating optics are synonymous.) With the zoom lens 1512 set to its lowest power, the omnidirectional imaging system provides an image of the entire hemisphere (or greater or less than a hemisphere if the embodiments of FIG. 11 or FIG. 13 are used). When zoomed in, the zoom lens 1512 provides a higher magnification (and, therefore, a higher resolution) of a smaller FOV. While zooming in, the effective center of projection of the zoom lens 1512 must remain approximately fixed to ensure that the imaging system remains telecentric. Preferably, the relay optics 1513 is used to ensure that the zoom lens 1512 remains telecentric over its entire settings.

In the embodiment of FIG. 15, the zoom lens 1512 may be either fixed or mobile with respect to the paraboloid-shaped reflector 1535. If the zoom lens 1512 is fixed, only regions around the paraboloidal axis (z) can be observed under magnification. Preferably, therefore, the zoom lens 1512 is equipped with some movement means, allowing the zoom lens to be positioned over and image regions along the outer edges of the paraboloid-shaped reflector 1535. Of course, such movement means must ensure that the optical axis of the zoom lens 1512 remains parallel to the paraboloidal axis of the paraboloid-shaped reflector 1535 at all times.

Figure 16:
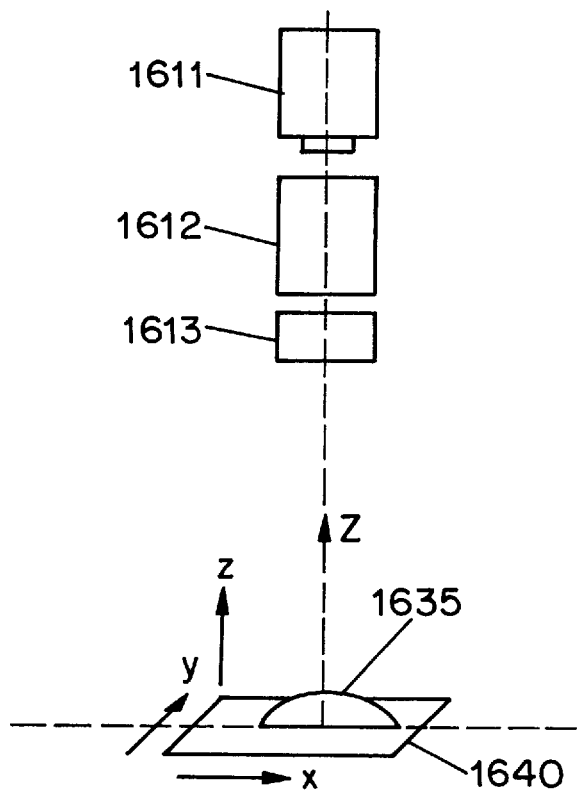
FIG. 16 is a partially isometric view of an embodiment of an omnidirectional imaging apparatus according to the present invention, which includes a paraboloid-shaped reflector mounted on a movable base.

FIG. 16 shows an omnidirectional imaging system that may be used to produce dynamically changing fields of view of a scene. A paraboloid-shaped reflector 1635 is mounted on a movable base 1640, which allows translation of the paraboloid-shaped reflector 1635 along the x, y and z axes. The movable base 1640 may be controlled either manually or with a computer. Using the movable base 1640, a dynamically changing field of view of a scene could be produced, for example, by a circular motion of the movable base 1640 about the optical axis (z). Preferably, the images are image processed as described previously to obtain perspective or panoramic views.

FIG. 16 further shows the use of a zoom lens 1612 in combination with the movable base 1640. A zoom lens 1612 adds the capability to zoom into sections of the paraboloid-shaped reflector 1635 brought under the view of the imaging system by the movement of the movable base 1640. Preferably, a relay lens 1613 is used to couple the zoom lens and the paraboloid-shaped reflector 1635. In addition, the zoom lens 1612 preferably includes a manual or automatic focus control to ensure that the sharpness of images are maintained over all sections of the paraboloid-shaped reflector 1635. Alternatively, translation of the reflector along the z axis may also be used to adjust the focus of an image.

Figure 17A:
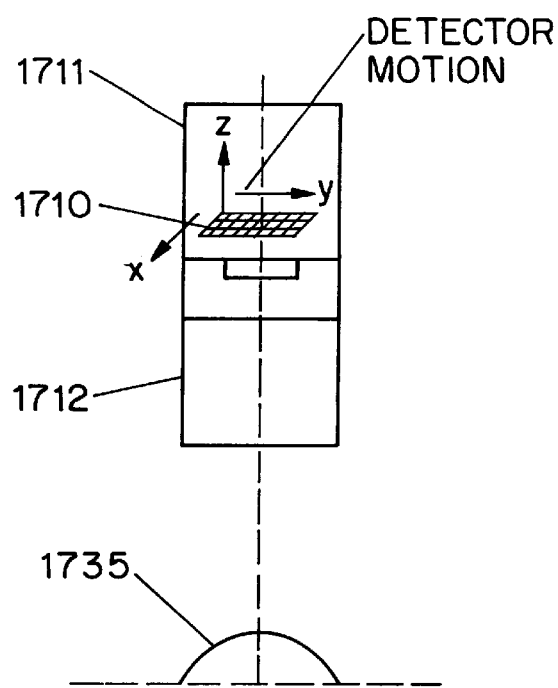
FIG. 17A is a side view of an embodiment of an omnidirectional imaging apparatus according to the present invention, which includes an image sensor mounted on a movable base.
Figure 17B:
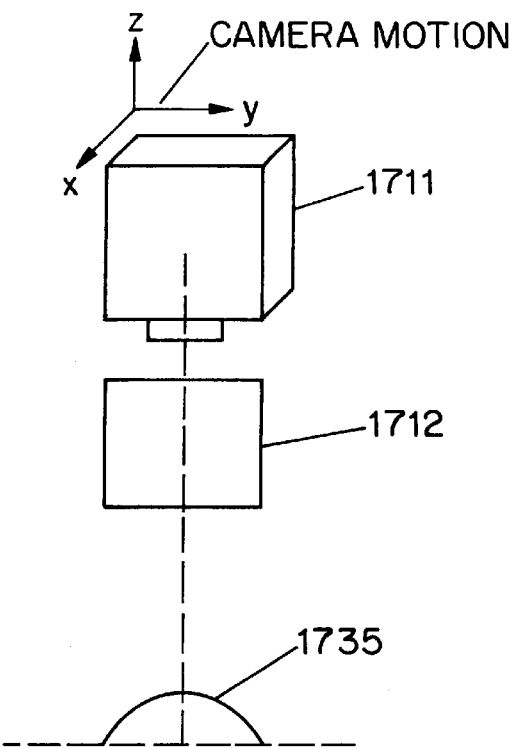
FIG. 17B is a side view of an embodiment of an omnidirectional imaging apparatus according to the present invention, which includes a movable camera.
Figure 17C:
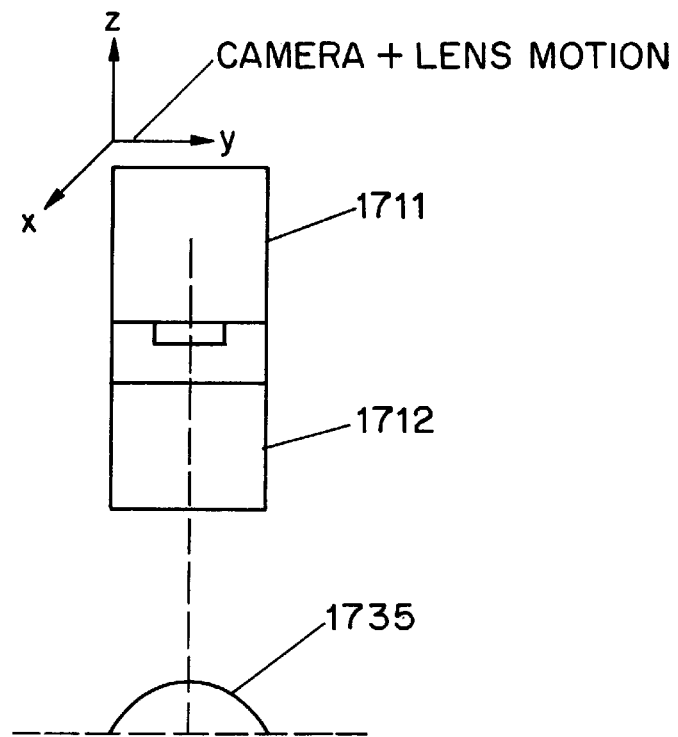
FIG. 17C is a side view of an embodiment of an omnidirectional imaging apparatus according to the present invention, which includes a movable camera and optics.

Instead of moving the paraboloid-shaped reflector as in the embodiment of FIG. 16, one or more parts of the camera or optics of the imaging system may alternatively be moved to achieve the same effect as the FIG. 16 embodiment. FIGS. 17A, 17B, and 17C show various exemplary embodiments of such omnidirectional imaging systems. In FIG. 17A, an image sensor 1710 (such as a CCD) is provided with movable means; in FIG. 17B, a camera 1711 is provided with movable means; and in FIG. 17C, both a camera 1711 and optics 1712 are provided with movable means, for moving together simultaneously. As shown in the figures, each of these components may be moved along any of the x, y, or z axes to change the field of view being imaged. As in the embodiment of FIG. 16, a zoom lens may be used to magnify areas of interest. Advantageously, by moving the camera or optics instead of moving the paraboloid-shaped reflector, the viewpoint of the omnidirectional imaging system remains fixed in space at the focal point of the paraboloid-shaped reflector.

The embodiments of FIG. 16, 17A, 17B, or 17C may be used to great advantage in a surveillance system. The omnidirectional imaging capability of these embodiments allows an operator to monitor an entire area of interest at once. When the operator observes a particular region of interest within the area being monitored, the operator may then select appropriate translational coordinates (for movement of the camera, optics, or paraboloid-shaped reflector), and appropriate zoom settings, to view the region of interest in greater detail.

Figure 18:
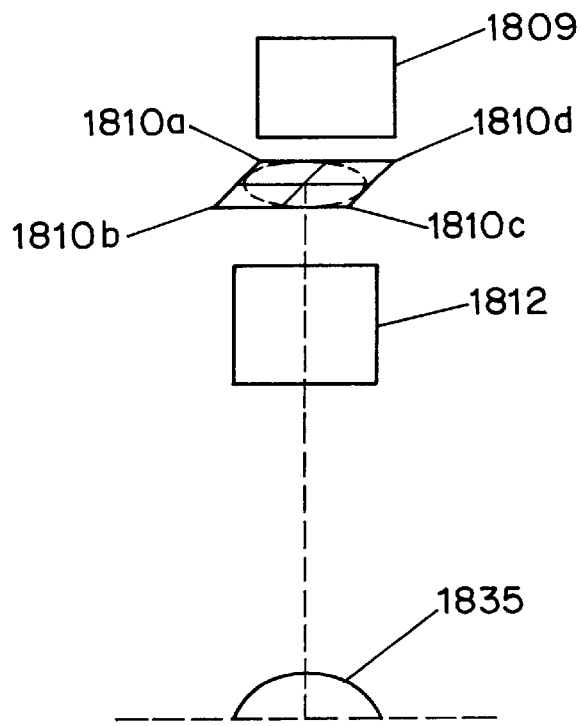
FIG. 18 is a partially isometric view of an embodiment of an omnidirectional imaging apparatus according to the present invention, which includes an image sensor comprising four charge coupled devices positioned side-by-side.

FIG. 18 shows an omnidirectional imaging system that utilizes multiple image sensors to achieve increased image resolution. The embodiment of FIG. 18 includes a paraboloid-shaped reflector 1835, video electronics 1809, four CCD elements 1811a–1810d, and imaging optics 1812. In this embodiment, the four CCD elements 1810a–1810d are placed side-by-side in a non-overlapping arrangement. The embodiment of FIG. 18 takes advantage of the fact that commercial CCD elements are typically manufactured in standard resolutions regardless of their size. Therefore, by using four, commercial ¼-inch CCD elements instead of a single, commercial ½-inch CCD element, the resolution of an image may advantageously be quadrupled. Although FIG. 18 shows the use of CCD elements placed in a non-overlapping arrangement, the invention described here is not limited to such an arrangement. Thus, an arrangement where multiple CCD elements partially overlap can likewise be used. Moreover, multiple image sensors may be fabricated into a single integrated circuit, with each image sensor connected to its own video circuitry.

Figure 19:
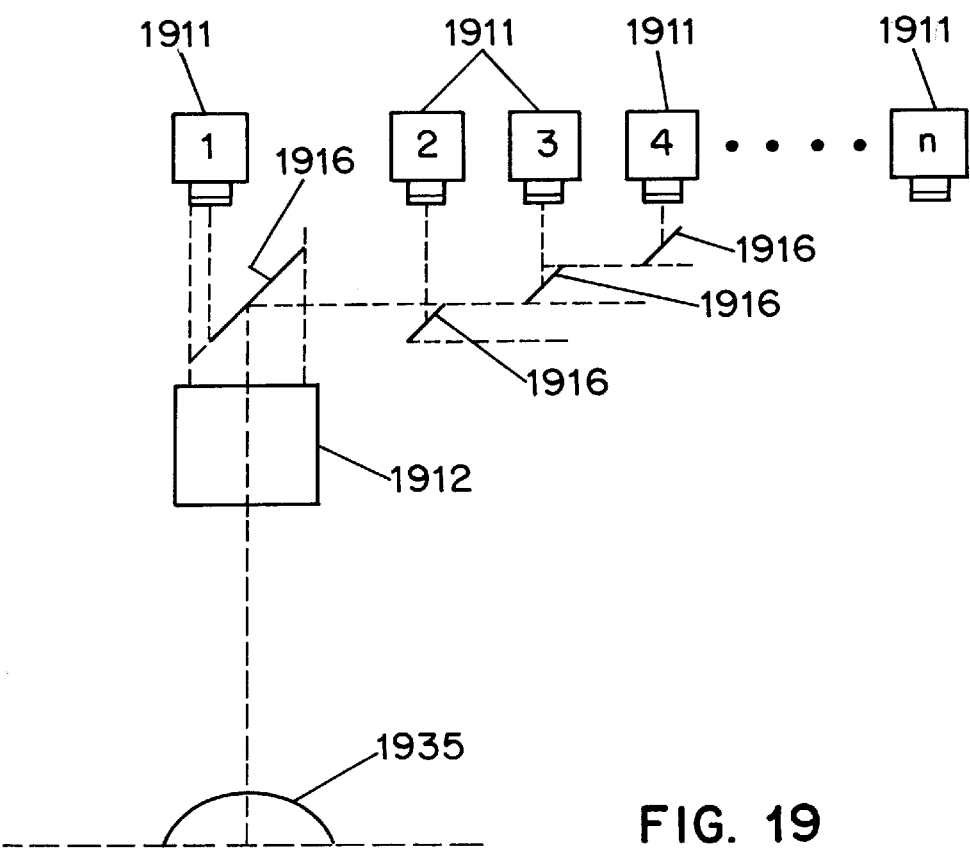
FIG. 19 is a side view of an embodiment of an omnidirectional imaging apparatus according to the present invention, which includes multiple image sensors and beam splitters.

FIG. 19 shows another embodiment that utilizes multiple image sensors to increase image resolution. In this instance, the multiple image sensors are provided by multiple cameras 1911. Beam splitters 1916 are used to direct separate sections of a paraboloidal image to different cameras. Advantageously, therefore, each portion of the paraboloidal image is imaged with a higher resolution than if the entire image were imaged by one camera alone.

In another exemplary embodiment of the present invention, dichroic beam splitters (not shown) may be used to split an image into a plurality of monochromatic images, which may be sensed by a plurality of monochromatic image detectors. These monochromatic images may later be suitably combined into a full-color image by image processing means well-known in the art.

Figure 20:
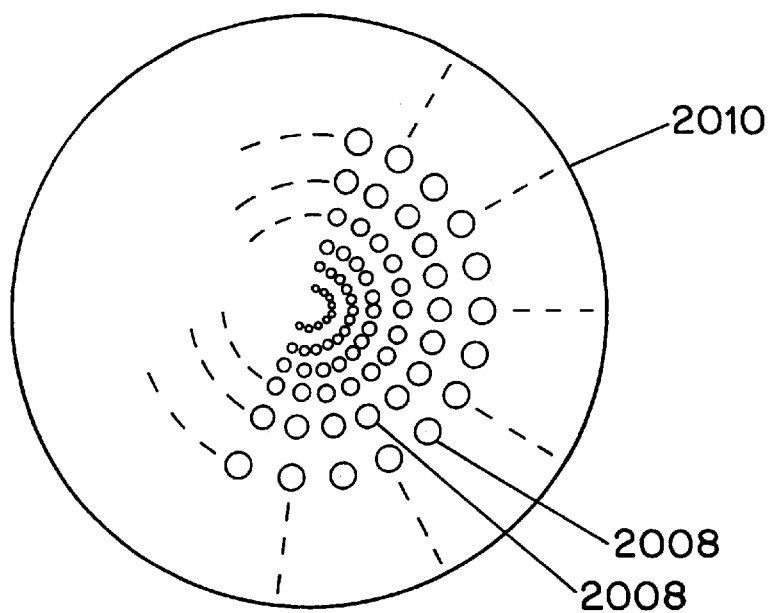
FIG. 20 is a top view of an image sensor according to an embodiment of the present invention whose sensing elements are non-uniformly distributed and sized.

FIG. 20 shows a planar image sensor 2010, as, for example, a CCD element. Using a typical planar image sensor with a paraboloid-shaped mirror, the effective resolution of a captured paraboloidal image is increasingly greater towards the outer edge of an image than at its center. For example, when a planar image sensor is used to capture an image reflected by a normal paraboloid-shaped reflector, the resolution of the captured image increases by a factor of four from the center of the image to its fringe. To compensate for this effect, an image sensor has sensing elements 2008 whose sizes and placements are varied to result in a uniform resolution over the entire image. This same approach may also be used to increase resolution in selected parts of the FOV. When specific resolution variations are difficult to incorporate, standard resolution variations, such as those provided by log-polar sensors, may also be used.

Figure 21:
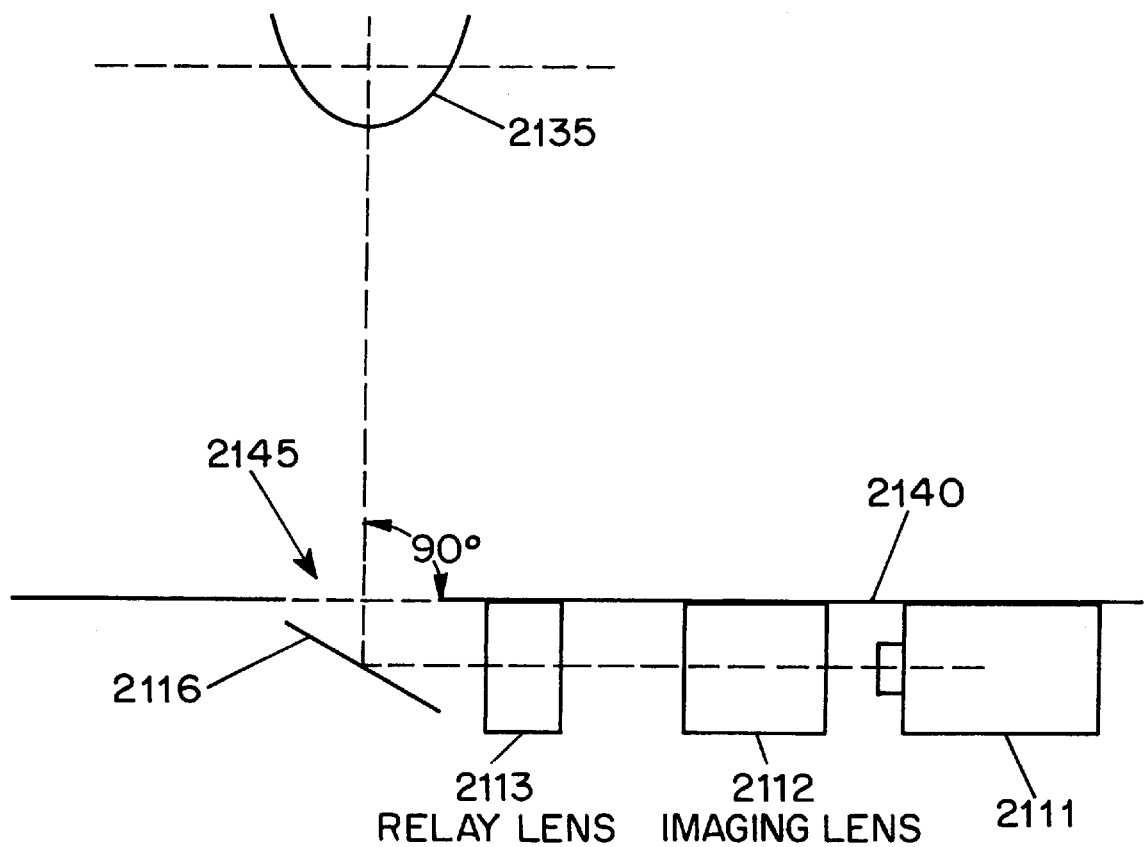
FIG. 21 is a side view of an embodiment of an omnidirectional imaging apparatus according to the present invention, which includes a planar mirror that optically couples a paraboloid-shaped reflector and an image sensor.

One or more planar mirrors may be included in an omnidirectional imaging apparatus according to the present invention for flexibility of placement of the optics and reflector. FIG. 21 shows a preferred embodiment in which an omnidirectional imaging system includes a paraboloid-shaped reflector 2135, a planar mirror 2116, a relay lens 2113, an imaging lens 2112, and a camera 2111. In the embodiment shown, the paraboloid-shaped reflector 2135 is positioned above a surface 2140, and the planar mirror 2116, relay lens 2113, imaging lens 2112, and camera 2111 are concealed below the surface 2140. The planar mirror 2116 is positioned beneath an opening 2145 in the surface 2140 and folds the image from the paraboloid-shaped reflector 90 degrees, thereby redirecting the image to the relay lens, imaging lens, and camera. Although the planar mirror is shown between the paraboloid-shaped reflector and the relay lens, the planar mirror may also be placed between the relay lens and the imaging lens or between the imaging lens and the camera, as those skilled in the art will appreciate.

Figure 22:
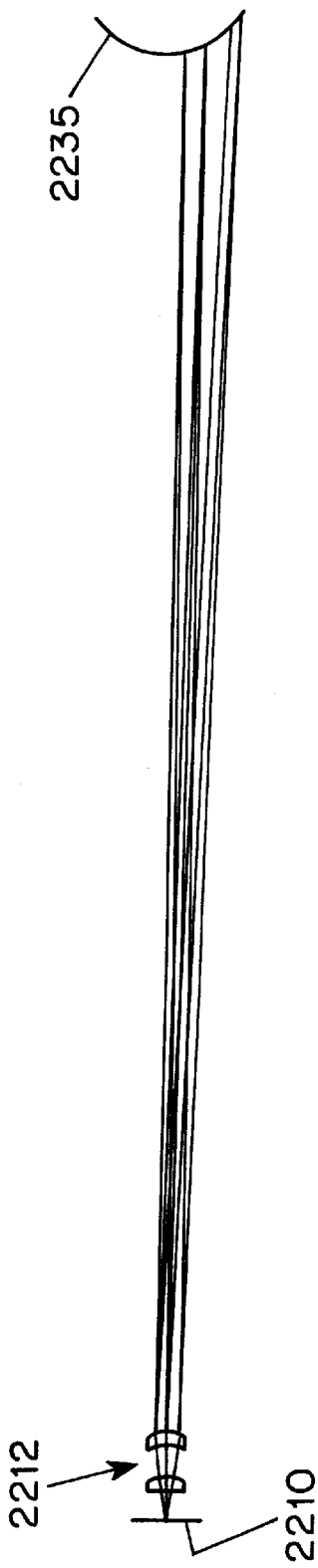
FIG. 22 is a side view of an embodiment of an omnidirectional imaging apparatus according to the present invention, which includes a microscope objective that optically couples a paraboloid-shaped reflector and an image sensor.

FIG. 22 shows an embodiment of an omnidirectional imaging system in which the optics between a paraboloid-shaped mirror 2235 and an image sensor 2210 comprise a low-power, inverted microscope objective 2212. In this embodiment, the reflector 2235 is at the position normally occupied by the eyepiece of the microscope and the image sensor 2210 is at the position normally occupied by a slide. The use of an inverted microscope objective is advantageous for imaging since commercial microscope objectives are well corrected for aberrations.

Figure 23:
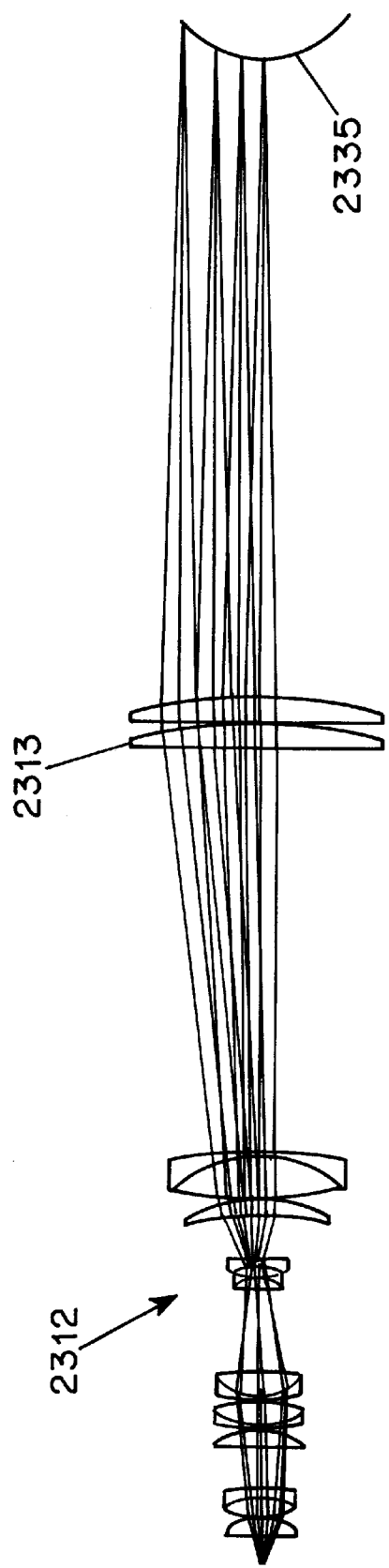
FIG. 23 is a side view of an embodiment of an omnidirectional imaging apparatus according to the present invention, which includes a collimator lens that optically couples a paraboloid-shaped reflector and an imaging lens.

FIG. 23 shows an embodiment of an omnidirectional imaging system in which a collimator lens 2313 is placed between a paraboloid-shaped mirror 2335 and imaging optics 2312. It is desirable to use commercially available imaging lens in many cases to save the cost and time of designing special lenses. Most commercial imaging lenses, however, are intended to image scenes that are very far from the lens. Indeed, they are normally designed for objects that are infinitely distant from lens. Therefore, when used to image objects that are close to the lens, the image suffers from various types of aberrations which degrade the effective resolution of the lens. The result is a "fuzzy" or smeared out image. In this embodiment, this problem is solved by the use of a collimating lens 2313, which produces a virtual object at infinity for the imaging optics 2312. Advantageously, therefore, the use of a collimating lens 2313 allows the use of commercially available imaging lenses.

Figure 24A:
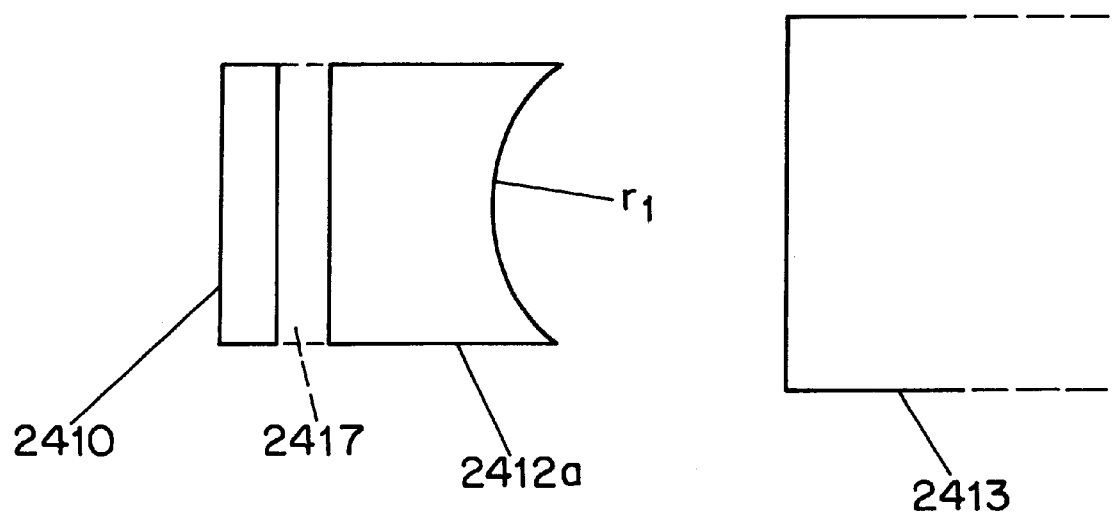
FIG. 24A is a side view of an embodiment of an omnidirectional imaging apparatus according to the present invention, which includes a field-flattening plano-concave lens.
Figure 24B:
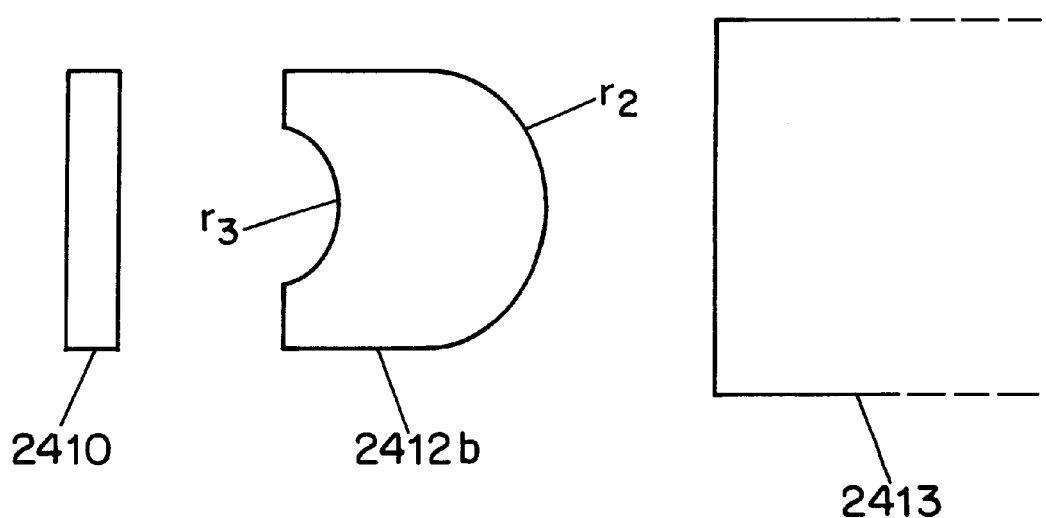
FIG. 24B is a side view of an embodiment of an omnidirectional imaging apparatus according to the present invention, which includes a field-flattening meniscus lens with aplanatic sides.

The embodiments of FIGS. 24A and 24B illustrate the use of field-flattening lenses between an image sensor 2410 and an imaging lens 2413. Field-flattening means are desirable because the paraboloid-shaped reflector of the present invention, having a typically small focal length of a few millimeters, is afflicted with very strong field curvature. One method of eliminating this imaging defect is to use an image sensor with a curved surface that matches the field curvature. More preferably, however, a special lens, called a field-flattening lens, may be introduced which has a curvature of opposite sign to that of the reflector. Therefore, the two field curvatures cancel, and the resultant image surface is flat, allowing the entire image to be in sharp focus on a planar image sensor.

Two types of preferred field-flattening lenses are illustrated in FIGS. 24A and 24B. In FIG. 24A, a plano-concave lens 2412a is shown. The plano-concave lens 2412a is placed as close as possible to the image sensor 2410. Preferably, the plano-concave lens 2412a is placed in contact with the image sensor window 2417. In this position, the plano-concave lens 2412a compensates for the field curvature of the reflector while introducing only small amounts of undesirable aberrations.

A second type of preferred field-flattening lens, a meniscus lens 2412b, is shown in FIG. 24B. Both of the surfaces of the meniscus lens 2412b are aplanatic to the incoming light. If a surface is aplanatic, it introduces no spherical aberration, coma or astigmatism into the beam of light; it only introduces field curvature. The meniscus lens 2412b has a marked field flattening effect which is determined by the thickness of the lens: the thicker the lens, the greater the field flattening effect. In contrast to the plano-concave lens 2412a of FIG. 24A, the meniscus lens 2412b of FIG. 24B is not used in contact with the image sensor 2410.

The theory of the field-flattening lenses will now be explained. Ideally, the surface of best focus of an optical system is a plane. With a planar surface, a CCD or other type of flat image sensor can match the surface of best focus over its entire area, thereby providing maximum resolution for the image. Unfortunately, an optical system has a tendency to form its best images on a curved surface. Accordingly, the curved focal surface and the flat CCD surface cannot be matched up over their entire area, and some or all of the image will not be in best focus.

The field curvature of an optical system is called its Petzval curvature. Every optical element in an optical system contributes to the Petzval curvature for the system. If a surface of an optical element is refracting, its Petzval contribution to the curvature of the system is:

$$p = \frac{1-n}{nR},$$

where n is the refractive index of the optical element and R is the radius of curvature of the surface of the optical element. Clearly, the Petzval contribution of a surface depends on the sign of the radius. If the surface is a mirror instead of a refracting surface, its Petzval contribution is:

$$P = -\frac{2}{R}.$$

The field curvature of an image is calculated by taking the sum of the contributions of all of the reflecting and refracting surfaces and multiplying the sum by a simple constant. If this value is not zero, then the field of the image is curved and the problem discussed above will be encountered (i.e., the surface of the image and the surface of the image sensor will not be completely matched).

Unfortunately, the curvatures of optical surfaces cannot be eliminated because they are necessary for other purposes, such as for controlling spherical aberration, coma and astigmatism. Because the control of these aberrations depends on the curvatures of optical elements, if the curvature of these elements is changed, these aberrations may be adversely effected. There are two ways, however, in which the Petzval curvature of an optical system may be changed without changing the other aberrations of a system. These two methods form the basis for the two types of field-flattening lenses described above.

The first method for changing the Petzval curvature depends on the optical characteristics of an optical surface located at the surface of an image. If an optical surface is located at the surface of an image (either an intermediate image or the final image of the optical system), then this surface will not change the spherical aberration, coma or astigmatism of the image. The only change will be to the Petzval curvature. Thus, the Petzval curvature of a system can be corrected by inserting a surface with an appropriate radius of curvature at the final focus of the system. This is the basis for the plano-concave field-flattening lens described above.

The second method for changing the Petzval curvature depends on the optical characteristics of aplanatic surfaces. Assume there is an aplanatic surface, which is defined as follows: Let s be the object distance for the surface and s' be the image distance. Also, let n and n' be the refractive indices of the materials before and after the surface, respectively (where n=1 for air and n>1 for glass). If s and s' are related by $$s' = \frac{R(n'+n)}{n'} = \frac{ns}{n'},$$

then the surface will introduce no spherical aberration or coma and only very small amounts of astigmatism. If now a thick lens is introduced, both of whose surfaces satisfy this condition, then the difference in their radii will depend on the thickness of the lens. This fact can again be used to control the Petzval curvature of the system by adjusting the thickness of the aplanatic lens. This is the basis of the thick, meniscus field-flattening lens discussed above.

In a preferred embodiment of the plano-concave lens 2412a of FIG. 24A, the plano-concave lens is composed of BK7 and has a refractive index (n) of 1.517. The radius of the curved (concave) surface $r_1$ is 6.2 mm. The surface opposite the curved surface $r_1$ is flat and is placed in contact with the image detector window 2417. The axial thickness of the lens is 1.5 mm, and the optical diameter is 3 mm.

In a preferred embodiment of the aplanatic lens 2412b of FIG. 24B, the aplanatic lens is composed of acrylic plastic and has a refractive index (n) of 1.494. The radius of the curved (convex) surface $r_2$ is 4.78 mm, and the radius of the curved (concave) surface $r_3$ is 2.16 mm. The axial thickness of the lens is 6.7 mm. The optical diameter of the curved surface $r_2$ is 7 mm, and the optical diameter of the curved surface $r_3$ is 2.7 mm.

Although the present invention has been described with reference to certain preferred embodiments, various modifications, alterations, and substitutions will be known or obvious to those skilled in the art without departing from the spirit and scope of the invention, as defined by the appended claims.

APPENDIX I

```c
compute_image.c
#include "stdlib.h"
#include "imageutil.h"
#include "stdio.h"
#include "math.h"
/* int main(int argc, char**argv) */
main(argc,argv)
int argc;
char*argv[];
{
  double sqrt(), atan(), sin(), cos(), acos();
  unsigned char *r, *g, *b;
  unsigned char *red;
  unsigned char *green;
  unsigned char *blue;
  int xsize, ysize;
  int xosize, yosize;
  int i, j, x0, y0, x1, y1;
  double theta, phi;
  double ox, oy, oz;
  double px, py, pz;
  double qx, qy, qz;
  double tempx, tempy, tempz;
  double sx, sy, sz;
  double rad, mag;
  double xs, ys, zs;
  double dispx, dispy;
  int xcent, ycent, xnew, ynew, xpix, ypix, xpoint, ypoint;
  int xpixel, ypixel, indexx, indexy, xcenter, ycenter;
  float radius, focal;
  /* printf("completed initializations\n\n"); */
  if(argc !=4){
    printf("arguments: xcenter, ycenter, radius\n");
    exit(0);
  }
  printf("\n");
  xcent = atoi(argv[1]);
  ycent = atoi(argv[2]);
  radius = atof(argv[3]);
  printf("omni-image: xcenter = %d ycenter = %d radius = %f\n\n",
      xcent, ycent, (float)radius);
  printf("input view pixel [xnovel ynovel]: ");
  scanf("%d %d", &xnew, &ynew);
  printf("\n");
  printf("selected view pixel: xnew = %d ynew = %d\n\n", xnew, ynew);
  printf("input new image parameters [xpixels ypixels focal]: ");
  scanf("%d %d %f", &xpix, &ypix, &focal);
  printf("\n");
  printf("output image: xpixels = %d ypixels = %d focal = %f\n\n",
      xpix, ypix, (float)focal);
  loadPPM("test.ppm", &r, &g, &b, &xsize, &ysize);
  printf("loaded omni-image file\n\n");
  xosize = xpix;
  yosize = ypix;
  /* printf("set new img size, xsize = %d, ysize = %d \n\n",
  xosize, yosize); */
  red = (unsigned char*)malloc(xosize * yosize * sizeof(unsigned char));
  green = (unsigned char*)malloc(xosize * yosize * sizeof(unsigned char));
  blue = (unsigned char*)malloc(xosize * yosize * sizeof(unsigned char));
  printf("allocated memory for new image file\n\n");
  xcenter = xcent;
  ycenter = ycent;
  xpoint = ynew - ycent;
  ypoint = xnew - xcent;
  tempx = (double)xpoint;
  tempy = (double)ypoint;
  tempz = (radius*radius - (tempx*tempx + tempy*tempy))/(2*radius);
  ox = tempx/sqrt(tempx*tempx + tempy*tempy + tempz*tempz);
  oy = tempy/sqrt(tempx*tempx + tempy*tempy + tempz*tempz);
  oz = tempz/sqrt(tempx*tempx + tempy*tempy + tempz*tempz);
  /* computed optical (z) axis */
  tempx = -oy;
  tempy = ox;
  tempz = 0;
  px = tempx/sqrt(tempx*tempx + tempy*tempy + tempz*tempz);
  py = tempy/sqrt(tempx*tempx + tempy*tempy + tempz*tempz);
  pz = tempz/sqrt(tempx*tempx + tempy*tempy + tempz*tempz);
  /* computed horizontal axis */
  tempx = py*oz - pz*oy;
  tempy = pz*ox - px*oz;
  tempz = px*oy - py*ox;
  qx = tempx/sqrt(tempx*tempx + tempy*tempy + tempz*tempz);
  qy = tempy/sqrt(tempx*tempx + tempy*tempy + tempz*tempz);
  qz = tempz/sqrt(tempx*tempx + tempy*tempy + tempz*tempz);
  /* computed vertical axis */
  printf("computed perspective image frame\n\n");
  /* raster scan perspective image plane */
  for(i=0;i<ypix;i++){
    dispy = (double)i - (double)ypix/2;
    for(j=0;j<xpix;j++){
      dispx = (double)xpix/2 - (double)j;
      sx = ox * focal + px * dispx + qx * dispy;
      sy = oy * focal + py * dispx + qy * dispy;
      sz = oz * focal + pz * dispx + qz * dispy;
      mag = sqrt(sx*sx + sy*sy + sz*sz);
      sx = sx/mag;
      sy = sy/mag;
      sz = sz/mag;
      /* computed vector in direction of current pixel */
      phi = atan2(sy,sx);
      theta = acos(sz/sqrt(sx*sx + sy*sy + sz*sz));
      /* converted vector to polar coordinates */
      rad = 2*radius*(1 -cos(theta))/(1 -cos(2*theta));
      /* found radius of intersection on parabola */
      xs = rad*sin(theta)*cos(phi);
      ys = rad*sin(theta)*sin(phi);
      zs = rad*cos(theta);
      /* found x, y, z coordinates on paraboloid */
  /*    printf("xs = %f ys = %f zs = %f\n\n", (float)xs, (float)ys,
        (float)zs); */
  /*  use xs,ys to read from input image and save in output image */
      /* check if image point lies outside parabolic image */
      if(sqrt(xs*xs + ys*ys) > radius){
        red[i * xpix + j] = 255;
        green[i * xpix + j] = 255;
        blue[i * xpix + j] = 255;
      }
      else{
        indexx = (int)ys + xcenter;
        indexy = (int)xs + ycenter;
  /*    printf("one pixel\n\n"); */
        /* write closest color value into pixel */
        red[i * xpix + j] = r[indexy * xsize + indexx];
        green[i * xpix + j] = g[indexy * xsize + indexx];
        blue[i * xpix + j] = b[indexy * xsize + indexx];
      }
    }
  }
  printf("computed perspective image\n\n");
  savePPM("out.ppm", red, green, blue, xpix, ypix);
  printf("saved new image file\n\n");
  system("xv out.ppm &");
  free(r);
  free(g);
  free(b);
  free(red);
  free(green);
  free(blue);
  printf("freed allocated memory\n\n");
  return 0;
}
```

What is claimed is:

1. An imaging apparatus for sensing an image of a scene from a substantially single viewpoint, comprising:

(a) a truncated, substantially paraboloid-shaped reflector positioned to orthographically reflect principal rays of electromagnetic radiation radiating from said scene that would otherwise pass through said substantially single viewpoint, said paraboloid-shaped reflector having a focus coincident with said single viewpoint of said imaging apparatus, including said paraboloid-shaped reflector;

(b) substantially telecentric means, optically coupled to said paraboloid-shaped reflector, for substantially filtering out principal rays of electromagnetic radiation which are not orthographically reflected by said paraboloid-shaped reflector; and (c) one or more image sensors positioned to receive said orthographically reflected principal rays of electromagnetic radiation from said paraboloid-shaped reflector, thereby sensing said image of said scene.

2. An omnidirectional imaging apparatus according to claim 1, wherein said paraboloid-shaped reflector is convex.

3. An omnidirectional imaging apparatus according to claim 1, wherein said paraboloid-shaped reflector is concave.

4. An omnidirectional imaging apparatus according to claim 1, wherein said paraboloid-shaped reflector comprises a substantially paraboloidal mirror having a surface which substantially obeys the equation expressed in cylindrical coordinates:

$$z = \frac{h^2 - r^2}{2h},$$

z being an axis of rotation of said surface, r being a radial coordinate, and h being a constant.

5. An omnidirectional imaging apparatus according to claim 1, wherein said one or more image sensors comprise one or more charge-coupled devices.

6. An omnidirectional imaging apparatus according to claim 1, wherein said one or more image sensors comprise one or more charge injection devices.

7. An omnidirectional imaging apparatus according to claim 1, wherein said one or more image sensors comprise photographic film.

8. An omnidirectional imaging apparatus according to claim 1, wherein said one or more image sensors comprise one or more video cameras.

9. An omnidirectional imaging apparatus according to claim 1, wherein said one or more image sensors has a curved surface that matches a field-curvature of said image.

10. An omnidirectional imaging apparatus according to claim 1, wherein at least one of said one or more image sensors has a non-uniform resolution.

11. An omnidirectional imaging apparatus according to claim 1, wherein said one or more image sensors are positioned along an axis passing through the vertex of said paraboloid-shaped reflector and through said focus of said paraboloid-shaped reflector.

12. An omnidirectional imaging apparatus according to claim 1, further comprising one or more planar mirrors positioned between said paraboloid-shaped reflector and said one or more image sensors, wherein said one or more planar mirrors optically couple said paraboloid-shaped reflector to said one or more image sensors.

13. An omnidirectional imaging apparatus according to claim 1, wherein said paraboloid-shaped reflector comprises a mirror truncated at a plane which includes said focus of said paraboloid-shaped reflector.

14. An omnidirectional imaging apparatus according to claim 1, wherein said paraboloid-shaped reflector comprises a mirror truncated at a plane that is substantially perpendicular to an axis passing through the vertex of said paraboloid-shaped reflector and through said focus of said paraboloid-shaped reflector.

15. An omnidirectional imaging apparatus according to claim 1, wherein said paraboloid-shaped reflector comprises a normal paraboloidal mirror.

16. An omnidirectional imaging apparatus according to claim 1, further comprising a transparent support coupling said paraboloid-shaped reflector to said one or more image sensors to thereby maintain the relative positions thereof.

17. An omnidirectional imaging apparatus according to claim 1, further comprising a fixed base and a movable base, wherein said paraboloid-shaped reflector is mounted on said fixed base and said one or more image sensors are mounted on said movable base, whereby movement of said one or more image sensors produces a changing field of view.

18. An omnidirectional imaging apparatus according to claim 17, further comprising a zoom lens positioned between and optically coupling said one or more image sensors and said paraboloid-shaped reflector.

19. An omnidirectional imaging apparatus according to claim 1, further comprising a fixed base and a movable base, wherein said paraboloid-shaped reflector is mounted on said movable base and said one or more image sensors are mounted on said fixed base, whereby movement of said paraboloid-shaped reflector produces a changing field of view.

20. An omnidirectional imaging apparatus according to claim 19, further comprising a zoom lens positioned between and optically coupling said one or more image sensors and said paraboloid-shaped reflector.

21. An omnidirectional imaging apparatus according to claim 1, wherein said one or more image sensors generate an image signal representative of said image of said scene, further comprising an image signal processing apparatus coupled to said one or more image sensors and receiving said image signal for converting said image signal into image signal data.

22. An omnidirectional imaging apparatus according to claim 21, wherein said image signal processing apparatus maps said image signal data into a Cartesian-coordinate system to produce a perspective image.

23. An omnidirectional imaging apparatus according to claim 21, wherein said image signal processing apparatus maps said image signal data into a cylindrical-coordinate system to produce a panoramic image.

24. An omnidirectional imaging apparatus according to claim 21, wherein said image signal processing apparatus further includes interpolation means for providing interpolated image data, whereby said interpolated image data and said image signal data are combined to form a digital image.

25. An omnidirectional imaging apparatus according to claim 24, wherein said image processing apparatus further includes means for zooming in on a preselected portion of said digital image to thereby provide an enlarged image of said preselected portion from a predetermined focal distance.

26. An omnidirectional imaging apparatus according to claim 1, wherein said telecentric means comprises a telecentric lens.

27. An omnidirectional imaging apparatus according to claim 1, wherein said telecentric means comprises a telecentric aperture.

28. An omnidirectional imaging apparatus according to claim 1, further comprising at least one lens optically coupling said one or more image sensors and said paraboloid-shaped reflector.

29. An omnidirectional imaging apparatus according to claim 28, wherein said at least one lens has a focal plane between said one or more image sensors and said at least one lens, and wherein said telecentric means is a telecentric aperture positioned along said focal plane.

30. An omnidirectional imaging apparatus according to claim 28, wherein said telecentric means comprises a collimating lens optically coupling said paraboloid-shaped reflector and said at least one lens.

31. An omnidirectional imaging apparatus according to claim 1, further comprising a zoom lens optically coupling said one or more image sensors and said paraboloid-shaped reflector.

32. An omnidirectional imaging apparatus according to claim 1, further comprising a field-flattening lens optically coupling said one or more image sensors and said paraboloid-shaped reflector, said field-flattening lens having a field curvature approximately opposite to the field curvature of said paraboloid-shaped reflector.

33. An omnidirectional imaging apparatus according to claim 32, wherein said field-flattening lens comprises a plano-concave lens which is positioned closely to said one or more image sensors.

34. An imaging apparatus according to claim 1, wherein said scene is a substantially hemispherical scene, and further comprising:

an additional truncated, substantially paraboloid-shaped reflector positioned to orthographically reflect principal rays of electromagnetic radiation radiating from an additional hemispherical scene that would otherwise pass through a substantially single viewpoint of said additional hemispherical scene, said additional paraboloid-shaped reflector having a focus coincident with said substantially single viewpoint of said additional hemispherical scene;

additional substantially telecentric means, optically coupled to said additional paraboloid-shaped reflector, for substantially filtering out principal rays of electromagnetic radiation which are not orthographically reflected by said additional paraboloid-shaped reflector; and additional one or more image sensors positioned to receive said orthographically reflected principal rays of electromagnetic radiation from said additional paraboloid-shaped reflector, thereby sensing said additional substantially hemispherical scene.

35. An omnidirectional imaging apparatus according to claim 34, wherein said additional hemispherical scene and said hemispherical scene are substantially complementary to one another so that the combination thereof is a substantially spherical scene, and wherein said paraboloid-shaped reflector and said additional paraboloid-shaped reflector are normal convex paraboloids, positioned back-to-back along their planes of truncation, and having a common paraboloidal axis and a common focus point.

36. An omnidirectional imaging apparatus according to claim 34, wherein said additional hemispherical scene and said hemispherical scene are substantially complementary to one another so that the combination thereof is a substantially spherical scene, and wherein said paraboloid-shaped reflector and said additional paraboloid-shaped reflector are normal concave paraboloids, positioned such that their vertexes coincide and they share a common paraboloidal axis.

37. An imaging method for sensing an image of a scene from a substantially single viewpoint, comprising the steps of:

(a) orthographically reflecting principal rays of electromagnetic radiation radiating from said scene that would otherwise pass through said substantially single viewpoint on a truncated, substantially paraboloid-shaped reflector such that said single viewpoint of said imaging method coincides with a focus point of said paraboloid-shaped reflector;

(b) telecentrically filtering out a substantial portion of any principal rays of electromagnetic radiation which are not orthographically reflected by said paraboloid-shaped reflector; and (c) sensing said orthographically reflected principal rays of electromagnetic radiation from said paraboloid-shaped reflector with one or more image sensors to thereby sense said image of said scene.

38. The method of claim 37, wherein step (c) comprises sensing said image of said scene from a position along an axis passing through the vertex of said paraboloid-shaped reflector and through said focus of said paraboloid-shaped reflector.

39. The method of claim 37, further comprising the step of optically coupling said paraboloid-shaped reflector and said one or more image sensors with one or more planar mirrors positioned between said paraboloid-shaped reflector and said one or more image sensors.

40. The method of claim 37, further comprising the steps of providing an image signal which is representative of said image of said scene and converting said image signal into image signal data.

41. The method of claim 40, further comprising the step of mapping said image signal data into a Cartesian-coordinate system to produce a perspective image.

42. The method of claim 40, further comprising the step of mapping said image signal data into a cylindrical-coordinate system to produce a panoramic image.

43. The method of claim 40, further comprising the steps of interpolating said image signal data to define approximate values for missing image data, and forming a digital image from said mapped image data and said interpolated image data.

44. The method of claim 43, further comprising the steps of zooming in on a preselected portion of said digital image to thereby obtain an enlarged image of said preselected portion from a predetermined focal distance, interpolating said image data to define approximate values for missing image data, and forming a digital image from said mapped image data and said interpolated image data.

45. The method of claim 37, wherein said scene is substantially hemispherical and further comprising the steps of:

orthographically reflecting principal rays of electromagnetic radiation radiating from an additional substantially hemispherical scene that would otherwise pass through a substantially single viewpoint of said additional hemispherical scene on an additional truncated, substantially paraboloid-shaped reflector such that said substantially single viewpoint of said additional hemispherical scene coincides with a focus point of said additional paraboloid-shaped reflector;

telecentrically filtering out a substantial portion of any principal rays of electromagnetic radiation which are not orthographically reflected by said additional paraboloid-shaped reflector; and sensing said orthographically reflected principal rays of electromagnetic radiation from said additional paraboloid-shaped reflector with additional one or more image sensors to thereby sense said additional hemispherical scene.

* * * * *

UNITED STATES PATENT AND TRADEMARK OFFICE
CERTIFICATE OF CORRECTION

PATENT NO.    : 6,118,474
DATED         : September 12, 2000
INVENTOR(S)   : Shree K. Nayar It is certified that error appears in the above-identified patent and that said Letters Patent is hereby corrected as shown below:

Title page,
Item [56], References Cited, U.S. PATENT DOCUMENTS: "5,760,826 6/1998 Nayer et al." should read -- 5,760,826 6/1998 Nayar et al. --

Item [56], References Cited, OTHER PUBLICATIONS: Under S. Bogner (first occurrence), "Cyberetics" should read -- Cybernetics --

Item [56], References Cited, OTHER PUBLICATIONS: Under Mitsubishi (first occurrence), "panaramic" should read -- panoramic --

Column 1,
Line 6, "1996, now" should read -- 1996, now --

Column 2,
Line 67, "hyperboidal" should read -- hyperboloidal --

Column 4,
Line 58, "monochomatic" should read -- monochromatic --

Column 9,
Line 47, "z=ra" should read -- z=r --

Column 17,
Line 57, in the formula, "$P$" should read -- $p$ --

Signed and Sealed this

Thirtieth Day of October, 2001

Attest:

NICHOLAS P. GODICI
*Attesting Officer*    *Acting Director of the United States Patent and Trademark Office*